(12) United States Patent
Blackwelder et al.

(10) Patent No.: US 10,498,275 B2
(45) Date of Patent: Dec. 3, 2019

(54) SYNCHRONOUS ELECTRICAL POWER DISTRIBUTION EXCITATION CONTROL SYSTEM

(71) Applicant: Rolls-Royce North American Technologies Inc., Indianapolis, IN (US)

(72) Inventors: Mark Jon Blackwelder, Plainfield, IN (US); Paul M. Rancuret, Indianapolis, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 37 days.

(21) Appl. No.: 15/367,032

(22) Filed: Dec. 1, 2016

(65) Prior Publication Data
US 2017/0170765 A1 Jun. 15, 2017

Related U.S. Application Data

(60) Provisional application No. 62/369,195, filed on Aug. 1, 2016, provisional application No. 62/369,184, filed
(Continued)

(51) Int. Cl.
*H02P 9/00* (2006.01)
*H02P 9/48* (2006.01)
(Continued)

(52) U.S. Cl.
CPC ............... *H02P 9/48* (2013.01); *H02P 9/00* (2013.01); *H02P 9/08* (2013.01); *H02P 9/14* (2013.01)

(58) Field of Classification Search
CPC ...... H02P 9/10; H02P 9/08; H02P 9/48; H02P 6/20
(Continued)

(56) References Cited

U.S. PATENT DOCUMENTS 4,625,160 A * 11/1986 Hucker .................... H02K 3/16
310/115
4,806,841 A * 2/1989 Lee .......................... H02P 9/42
310/68 D
(Continued)

FOREIGN PATENT DOCUMENTS

CN 102148492 B 8/2014
GB 871 188 A 6/1961
JP 2004-015980 A 1/2004

OTHER PUBLICATIONS

International Search Report, PCT Application No. PCT/US2016/066422, pp. 1-23, dated May 3, 2017, European Patent Office, Rijswijk, The Netherlands.
(Continued)

*Primary Examiner* — Julio C. Gonzalez
(74) *Attorney, Agent, or Firm* — Brinks Gilson & Lione

(57) ABSTRACT

A system includes an exciter configured to operate with a synchronous generator. The exciter may be mechanically coupled and rotatable with the synchronous generator, or the exciter may be independently rotatable. The exciter is configured to output a field current for exciting the synchronous generator to produce a voltage and a current at an output of the synchronous generator. The synchronous generator may be synchronized with loads during a time when the synchronous generator is at substantially zero speed and the loads, such as motors, are at zero speed. A controller included in the system is configured to control output of the field current by the exciter with an exciter voltage. The controller may control the exciter voltage to selective include an AC component and DC component in accordance with a rotational speed of the exciter.

19 Claims, 10 Drawing Sheets

Related U.S. Application Data on Jul. 31, 2016, provisional application No. 62/267,143, filed on Dec. 14, 2015.

(51) Int. Cl.
  *H02P 9/08* (2006.01)
  *H02P 9/14* (2006.01)

(58) Field of Classification Search
  USPC .............. 322/44, 56, 20, 29; 290/40 B, 40 R
  See application file for complete search history.

(56) References Cited

U.S. PATENT DOCUMENTS

| | | | | |
|---|---|---|---|---|
| 4,830,412 A | * | 5/1989 | Raad | F02N 11/04 |
| | | | | 290/31 |
| 4,841,216 A | | 6/1989 | Okada et al. | |
| 5,097,195 A | | 3/1992 | Raad et al. | |
| 5,430,362 A | * | 7/1995 | Carr | F02N 11/04 |
| | | | | 318/139 |
| 5,581,168 A | * | 12/1996 | Rozman | F02N 11/04 |
| | | | | 290/22 |
| 5,587,647 A | * | 12/1996 | Bansal | F02N 11/04 |
| | | | | 290/31 |
| 7,116,073 B1 | * | 10/2006 | Sorkin | H02P 23/10 |
| | | | | 318/530 |
| 7,173,399 B2 | | 2/2007 | Sihler et al. | |
| 8,358,111 B2 | * | 1/2013 | Rozman | H02P 9/307 |
| | | | | 322/10 |
| 8,890,454 B2 | | 11/2014 | De Franciscis | |
| 2009/0167231 A1 | | 7/2009 | Sussmeier | |
| 2011/0109085 A1 | | 5/2011 | Nelson | |
| 2012/0098261 A1 | * | 4/2012 | Rozman | F02N 11/006 |
| | | | | 290/31 |
| 2012/0306458 A1 | | 12/2012 | Fogarty | |
| 2012/0313372 A1 | | 12/2012 | Bjerknes | |
| 2013/0175871 A1 | | 7/2013 | Kniippel et al. | |

OTHER PUBLICATIONS

European Search Report, European Application No. 16203502.6, pp. 1-7, dated May 11, 2017, Munich, Germany.

Miri, A. M., C. Sihler, and T. Zöller. "Active Damping of Torsional Modes in Turbine-Generator Shafts." 2009, pp. 1-6, *IEEE Power Electronics Specialists Conference (PESC)*. 2009.

European Office Action, dated Feb. 28, 2019, pp. 1-6, issued in European Patent Application No. 16203502.6, European Patent Office, Munich, Germany.

* cited by examiner

SYNCHRONOUS ELECTRICAL POWER DISTRIBUTION EXCITATION CONTROL SYSTEM

CROSS-REFERENCE TO RELATED APPLICATIONS

This application is a non-provisional application which claims priority under 35 USC § 119(e) to U.S. provisional application 62/267,143, "SYNCHRONOUS ELECTRICAL POWER DISTRIBUTION SYSTEM STARTUP AND CONTROL" filed Dec. 14, 2015, and which also claims priority under 35 USC § 119(e) to U.S. provisional application 62/369,195, "SYNCHRONOUS ELECTRICAL POWER DISTRIBUTION EXCITATION CONTROL SYSTEM" filed Aug. 1, 2016, and which also claims priority under 35 USC § 119(e) to U.S. provisional application 62/369,184, SYNCHRONOUS ELECTRICAL POWER DISTRIBUTION SYSTEM, filed Jul. 31, 2016, all of which are incorporated herein by reference.

TECHNICAL FIELD

This disclosure relates to synchronous alternating current systems and, in particular, to synchronous generators.

BACKGROUND

Synchronous power systems are commonly used for efficiently powering electrical motors that drive fans, compressors, pumps, and other types of loads. Asynchronous electrical machines produce (e.g., motors) or consume (e.g., generators) torque only in conditions where the mechanical speed is different than the electrical speed. The magnitude of the difference of mechanical and electrical speeds is commonly referred to as "slip". Asynchronous motors produce at least partial, and up to full rated, torque at all mechanical speeds less than the electrical voltage speeds, thus allowing acceleration rapidly to near matching electrical and mechanical speeds when connected to an electrical bus operating at constant speed, or "line start". The ratio of electrical speed with respect to mechanical speed of an electrical machine is defined by the number of magnetic pole pairs of the specific design. Examples of asynchronous motors are induction motors which function based on Eddy current phenomena and hysteresis motors which rely on magnetic hysteresis phenomena. Induction motors are commonly used to drive mechanical loads from fixed speed national electric grids due to their "line start" capacity.

Synchronous electrical machines produce (e.g., motors) or consume (e.g., generators) torque only in conditions where the mechanical speed is equal to the electrical speed and the rotor and stator magnetic poles are misaligned. Synchronous machines commonly cannot "line start" due to the impractical requirement to connect the nonrotating motor to the rotating electrical grid at precisely aligned stator and rotor magnetic poles and develop sufficient torque to accelerate the rotor to electrical speed before misalignment exceeds ninety degrees electrical, where accelerating torque decreases and becomes negative at one hundred eighty degrees electrical. Synchronous machines are uncommon for driving mechanical loads from fixed speed national electrical grids due to the need to add "line start" functionality. A synchronous generator may provide such a system with the electrical power needed to spin the electrical motors that drive the loads. In some systems, the generator and load driving motors may be accelerated to operating speed using power electronics, a pony motor, and/or extra induction rotor devices; all of which may increase losses (thereby decreasing efficiency) and add mass to the system.

SUMMARY

In one example, the disclosure is directed to a system that includes an exciter configured to output an excitation signal to control a magnetic field of a synchronous generator, and a controller configured to control the exciter with an exciter voltage to control the magnetic field and electric power output of the synchronous generator over a range of rotational speed of the exciter. A waveform of the exciter voltage may be selectively include at least one of an AC component or a DC component, and the controller may transition a level of the AC component lower and transition a level of the DC component higher based on an increase in rotational speed of the exciter within the range of rotational speed and electric power output of the synchronous generator.

In another example, the disclosure is directed to a system that includes an exciter configured to generate a variable field current for a synchronous generator. The synchronous generator is configured to output variable electric power in accordance with the variable field current. The system also includes a controller configured to control an exciter voltage of the exciter using a voltage input signal to generate the variable field current for the synchronous generator. The controller may selectively include at least one of a DC component or an AC component in the exciter voltage with the voltage input signal. The controller may independently vary the level of the AC component and the level of the DC component as a rotational speed of the exciter changes and the synchronous generator outputs variable electric power.

In yet another example, the disclosure is directed to method that includes the step of controlling, with a controller, an exciter voltage of an exciter. The exciter may generate a variable field current corresponding to the exciter voltage. The method also includes the steps of exciting a synchronous generator to output electric power based on the exciter voltage, commencing rotation of the exciter and the synchronous generator from a zero speed condition, and controlling, with the controller, a level of an AC component of the exciter voltage so that the synchronous generator outputs electric power at the zero speed condition or at a time rotation of the exciter and the generator begins. The method further includes the step of decreasing, with the controller, the level of the AC component of the exciter voltage while increasing, with the controller, a DC component of the exciter voltage as a rotational speed of the exciter and the synchronous generator increases.

The details of one or more examples are set forth in the accompanying drawings and the description below. Other features, objects, and advantages of the disclosure will be apparent from the description and drawings, and from the claims.

DETAILED DESCRIPTION

The techniques and circuits described in this disclosure may enable a controller of an example synchronous power system to synchronize a generator to one or more load driving motors by carefully controlling the field current of an exciter to the generator and rotational acceleration or speed of the prime mover shaft. As such, the example synchronous power system may perform generator to load-motor synchronization without suffering from an increase in mass or decrease in efficiency that is commonly caused by power electronics, pony motors, and induction rotor devices which are typically used to synchronize other power systems.

Figure 1:
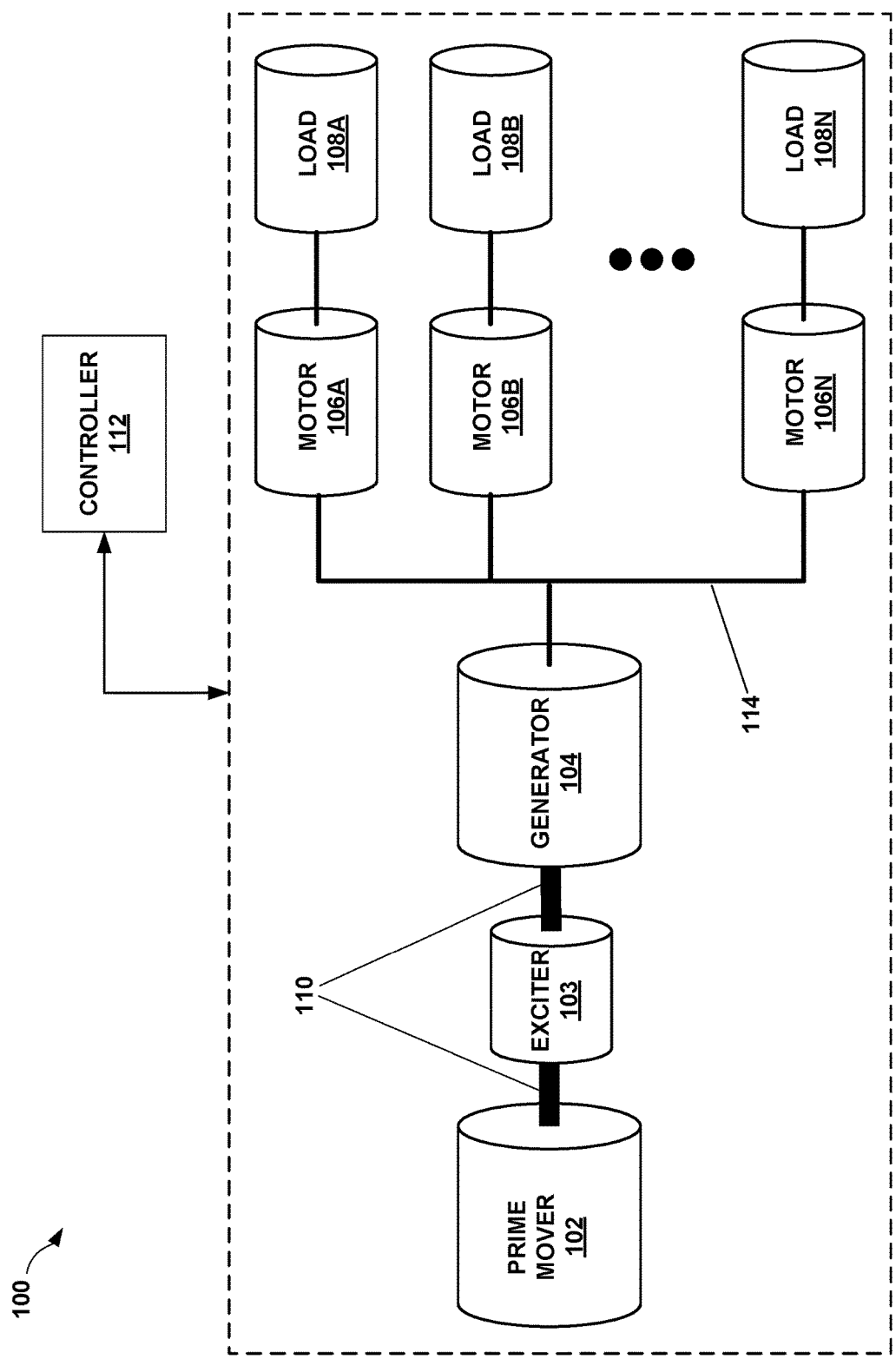
FIG. 1 is a conceptual diagram illustrating an example synchronous power system for providing electrical power from an alternating current generator to one or more motors, in accordance with one or more aspects of the present disclosure.

FIG. 1 is a conceptual diagram illustrating system 100 as an example synchronous power system for providing polyphase electrical power from at least one alternating current generator to one or more motors, in accordance with one or more aspects of the present disclosure. The polyphase electrical power may be balanced polyphase electrical power, such as three phase or six phase balanced electrical power. System 100 includes prime mover 102, exciter 103, generator 104, motors 106A-106N (collectively referred to as "motors 106), and loads 108A-108N (collectively referred to as "loads 108"). System 100 also includes controller 112 for controlling each of components 102, 103, 104, 106, and 108.

Prime mover 102 is configured to provide mechanical energy to system 100 by rotating or spinning shaft 110. Prime mover 102 is any type of machine, whether an engine or a motor, that is configured to produce mechanical energy for use in a synchronous power system. Examples of prime mover 102 include heat engines (e.g., internal or external combustion engines), electrical motors, pneumatic motors, hydraulic motors, jet engines, or any other type of machine that can be controlled so as to vary the rotational speed or acceleration of shaft 110. In some examples, the acceleration or speed of prime mover 102 can be finely controlled during start-up. For example, prime mover 102 may be controllable so that the speed of prime mover 102 increases during a first phase of a start-up period (e.g., one to two seconds, up to about thirty seconds), from substantially zero to one percent of its operational speed. Once prime mover 102 reaches one percent of its operational speed, prime mover 102 may be controllable so that the speed of prime mover 102 increases much more quickly during a second phase of the start-up period (e.g., thirty to fifty seconds), from one percent to eighty or one hundred percent of its operational speed.

Exciter 103 and generator 104, in combination, convert the mechanical energy provided by prime mover 102 into a suitable form of electrical energy for powering and spinning motors 106 to drive loads 108. Alternatively, exciter 103 and generator 104 may be on separate shafts, or exciter 103 may not be a shaft driven device. Exciter 103 is configured to provide or otherwise output a field current $I_{FIELD}$ (also referred to as a "magnetizing current") to generator 104. Generator 104 uses the field current $I_{FIELD}$ to magnetize the electromagnets in its rotor such that when the rotor spins with shaft 110, generator 104 produces an alternating current at electrical bus 114. Exciter 103 may produce the field current $I_{FIELD}$ by producing an electromotive force (EMF) which induces an alternating (AC) current, and then by rectifying the AC current, exciter 103 outputs the field current $I_{FIELD}$ in a direct (DC) current form.

In the example of FIG. 1, generator 104 is an AC generator. In some examples, generator 104 is configured to output variable frequency, three-phase AC power onto bus 114. In other examples, generator 104 may output any poly-phase (e.g., two or more phase) AC power onto a single bus such as bus 114 or multiple buses. In the example of FIG. 1, exciter 103 is a brushless field exciter (e.g., a rotating-rectifier exciter). Exciter 103 may be any type of exciter that can produce a controllable field current $I_{FIELD}$.

Motors 106 represent any type of synchronous, asynchronous, or hybrid combination thereof, motor for receiving AC electrical power provided by a synchronous power system, such as polyphase electrical power provided by system 100. In the example of FIG. 1, motors 106, such as synchronous motors, are electrically coupled to generator 104 via bus 114. For example, motors 106 may be propulsion motors for an aircraft or marine craft, for example, for driving propellers. Motors 106 may include additional sensors and/or feedback circuitry for providing information (e.g., voltage, current, speed, frequency, phased, etc.) back to the components of system 100 that are used to control motors 106, such as controller 112.

Loads 108 represent any type of motor-driven load. In the example of FIG. 1, loads 108 are mechanically coupled to motors 106. Examples of loads 108 include propellers, fans, compressors, pumps, screws, or any other type of load that is driven by an electrical motor, such as one of motors 106, and do not exhibit zero speed or static torque. Thus, the loads 108 may exhibit a linear increase in counter torque as the rotational speed of individual loads 108 increases with a corresponding increase in the speed of a motor 106. The loads may be non-linear loads having torque that is monotonic to speed so that as speed increases, torque increases. In other words, torque may be continuous through a range of speed such that the motors may have a uniformly smooth torque curve.

System 100 includes controller 112, which is configured to synchronize generator 104 to the motors 106 by controlling a level of the field current $I_{FIELD}$ being output from exciter 103 based on a speed of shaft 110. For the sake of brevity and clarity, controller 112 is shown as, generally, being operatively coupled to any or all of components 102, 103, 104, 106, and 108, 110, and 114. In other words, controller 112 is configured to provide signals and information to, and receive information from (e.g., as feedback), each of the different components of system 100. For example, controller 112 may send information to prime mover 102 to vary the acceleration or speed of shaft 110. As another example, controller 112 may send information to exciter 103 to vary or otherwise control the field current $I_{FIELD}$ provided to generator 104.

Controller 112 may comprise any suitable arrangement of hardware that may include software or firmware configured to perform the techniques attributed to controller 112 that are described herein. Examples of controller 112 include any one or more computing systems, computing devices, microprocessors, digital signal processors (DSPs), application specific integrated circuits (ASICs), field programmable gate arrays (FPGAs), or any other equivalent integrated or discrete logic circuitry, as well as any combinations of such components. Thus, there may be any number of independently operating controllers 112 in the system 100 that may or may not be in direct communication with each other. Controller 112 that includes software or firmware also includes hardware, such as one or more processors, processing units, processing components, or processing devices, for storing and executing the software or firmware contained therein.

In general, a processor, processing unit, processing component, or processing device is a hardware device that may include one or more microprocessors, DSPs, ASICs, FPGAs, or any other equivalent integrated or discrete logic circuitry, as well as any combinations of such components. Although not shown in FIG. 1, controller 112 may include a memory configured to store data. The memory may be any form of storage medium that is other than transitory, and may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 112 (e.g., may be external to a package in which controller 112 is housed) and may include or comprise any suitable storage medium, such as a non-transitory storage medium, for storing instructions that can be retrieved and executed by a processor of controller 112.

In some examples, controller 112, or any portion thereof, may be an internal component or feature of any of components 102, 103, 104, 106, or 108. In other words, any one or more of components 102, 103, 104, 106, or 108 may include controller 112, or any feature or characteristic associated with controller 112 that is described herein, as an internal component.

In operation, controller 112 may provide a signal or command (directly or indirectly) to prime mover 102 that causes shaft 110 to begin spinning with a particular rotational speed or acceleration in accordance with the signal or command provided by controller 112. Controller 112 may provide an additional signal or command to exciter 103 that causes exciter 103 to produce a particular field current $I_{FIELD}$ based at least partially on the signal or command from controller 112. The field current and speed with which shaft 110 spins may cause generator 104 to output a two or more phase AC electrical signal across electrical bus 114. Motors 106 may be energized by the AC electrical signal received via bus 114 to drive loads 108.

By providing signals and/or commands to prime mover 102, exciter 103, and generator 104, controller 112 may synchronize generator 104 to motors 106 by carefully controlling the field current $I_{FIELD}$ exciter 103 provides to generator 104 and by also carefully controlling the acceleration or speed of shaft 110. As such, controller 112 may alone perform generator to load-motor synchronization. Accordingly, system 100 may not suffer from an increase in mass or decrease in efficiency that is commonly caused by power electronics, pony motors, and induction rotor devices which are typically used to synchronize generators to motors of other power systems.

Figure 2:
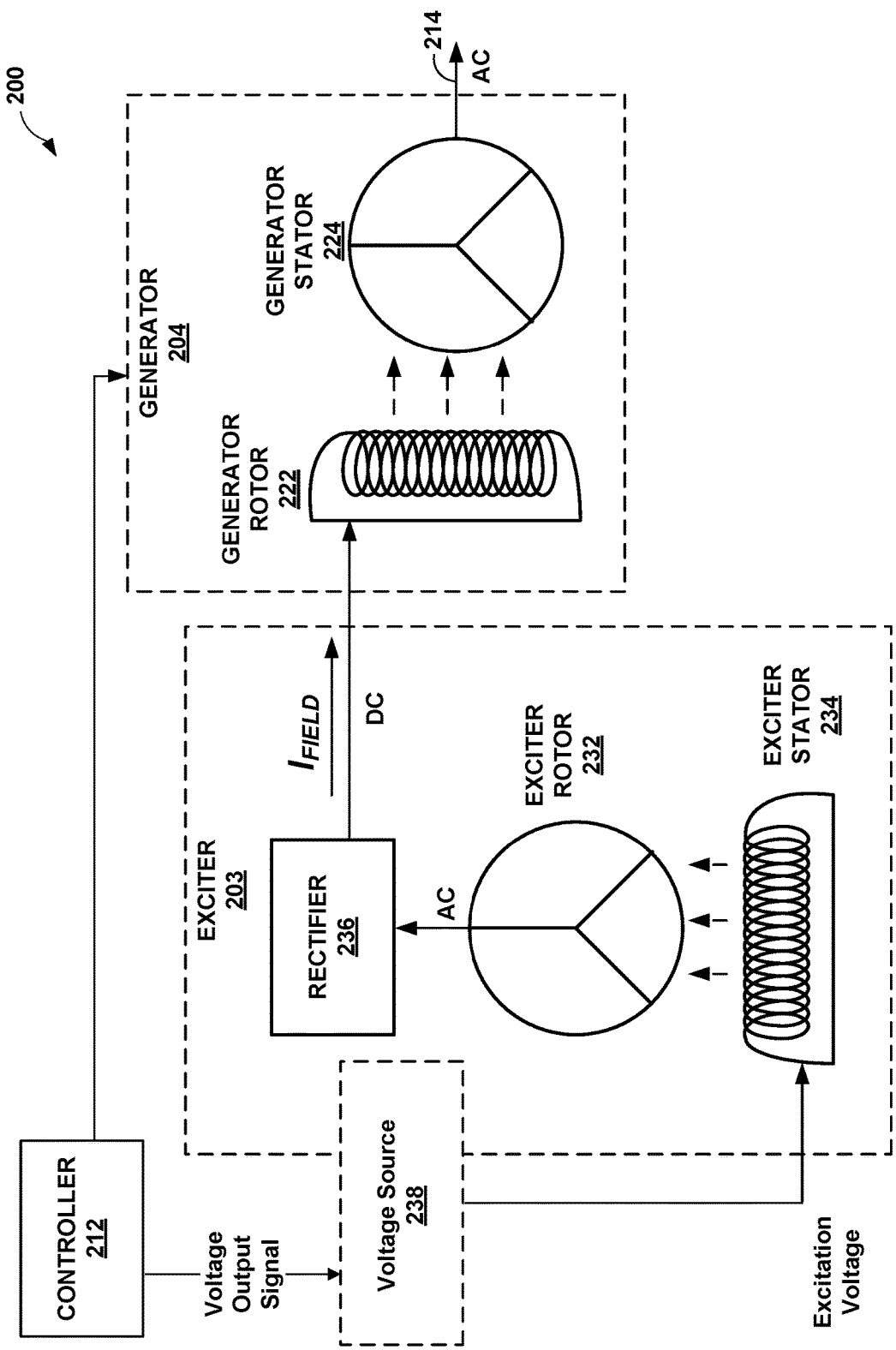
FIG. 2 is a schematic diagram illustrating a portion of an example synchronous power system for providing electrical power from an alternating current generator to one or more motors, in accordance with one or more aspects of the present disclosure.

FIG. 2 is a schematic diagram illustrating system 200 as a portion of an example generator of an example synchronous power system, such as system 100 of FIG. 1, for providing polyphase electrical power from an alternating current generator, such as a synchronous generator, to one or more motors, such as synchronous motors, in accordance with one or more aspects of the present disclosure. For the sake of brevity and ease of description, system 200 is described within the context of FIG. 1. For example, exciter 203 and generator 204 of system 200 represent examples of, respectively, exciter 103 and generator 104 of system 100. Exciter 203 and generator 204 are controllable by controller 212 of system 200 which represents an example of controller 112 of system 100.

Exciter 203 represents an example of a brushless exciter and is configured to output field current $I_{FIELD}$ to generator 204. Exciter 203 is controllable by controller 212 such that signals or commands from controller 212 in the form of a voltage output signal (exciter voltage) cause exciter 203 to output a variable level field current $I_{FIELD}$. Exciter 203 includes exciter rotor 232, exciter stator 234, and rectifier 236. Exciter 203 may include other components required to produce field current $I_{FIELD}$.

Rectifier 236 rectifies an AC current output from exciter rotor 232 to a DC field current $I_{FIELD}$ output that is used by generator 204 to magnetize generator rotor 222. In some examples, rectifier 236 is a full-bridge rectifier.

Exciter stator 234 may include an exciter field coil, which is a set of stationary coils. In other words, the exciter field coil does not move or spin with movement of a prime mover shaft. Exciter stator 234 may be energized, by controller 112 using a controlled voltage source 238, to induce a current in the exciter stator 234. The voltage source 238 may supply the exciter voltage. The voltage source 238 may transition the exciter voltage between an AC voltage signal and a DC voltage signal such that an AC current, a DC current or some combination of an AC current waveform and a DC current waveform may be induced with the exciter stator 234. Accordingly, the exciter voltage may selectively include an AC component and a DC component. The level of the AC component and the DC component in the exciter voltage may be selectively and/or independently varied by the controller based on a rotational speed of the exciter rotor 232. Thus, a waveform of the exciter voltage may selectively include at least one of an AC component or a DC component. In addition, the controller may transition a level of the AC component lower and transition of a level of the DC component higher based on an increase in rotational speed of the exciter while electric power output of the synchronous generator is occurring.

Controller 112 may control the voltage level of the voltage source 238 (exciter voltage) via the voltage output signal to vary the level of the current that is induced by exciter stator 234. The voltage source 238 is illustrated with dotted lines since the voltage source 238 may be included in the controller 212, and may be controlled using a voltage regulation circuit or through other voltage regulation techniques. Alternatively, the voltage source 238 may be a separate device or system that receives the voltage output signal from the controller 212 and produces the exciter voltage, or may be included in the exciter 203 and receives the voltage output signal. For purposes of brevity, the exciter voltage will be described as being controlled by the controller 212 using an output voltage signal, although it should be recognized that the controller 212 may provide the exciter voltage or control output of the exciter voltage.

Exciter rotor 232 may include an exciter armature, which is a set of balanced coils, coupled to shaft 110 (not shown) of system 100, which is driven by prime mover 102 of system 100, and controlled by controller 212 to spin at a variable speed or acceleration. In other words, unlike the exciter field coil which may remain stationary, the exciter armature may move or spin with movement of a prime mover shaft. The balanced coils of exciter rotor 232 are connected through rectifier 236 to generator rotor 222. When the exciter armature of exciter rotor 232 is rotating or spinning, the magnetic flux produced by the exciter field coil of exciter stator 234 is provided by the exciter armature coils of exciter rotor 232 to rectifier 236. This change in magnetic flux in the exciter armature coils of exciter rotor 232 generates an electromotive force (EMF). This EMF induces current in the field winding of generator rotor 222 during a first portion of the EMF AC cycle. The flux produced by the exciter armature coil of exciter rotor 232 then decreases as it leaves the magnetic flux region of exciter field coil of exciter stator 234, and an opposite EMF is generated. Rectifier 236 naturally applies the EMF in a consistent manner to induce current flow in one direction, as field current $I_{FIELD}$, through the field coil of generator rotor 222.

Generator 204 is configured to output an AC power to electrical bus 214. Generator 204 is controllable by controller 212 such that a signal and/or command (voltage output signal) from controller 212 controls the exciter voltage, which may cause generator 204 to output AC power at a variable power level or variable frequency at bus 214. Generator 204 includes generator rotor 222 and generator stator 224.

Generator rotor 222 may include a rotating field coil that spins or rotates with shaft 110 of system 100 congruently with the spinning or rotation of exciter rotor 232. The field coil of generator rotor 222 is typically much more inductive than the rotor coils of exciter rotor 232, and as such, the field coil of generator rotor 222 may filter the fundamental frequency of field current $I_{FIELD}$ (i.e., the rectified exciter current). Field current $I_{FIELD}$ from exciter 203 magnetizes generator rotor 222.

Generator stator 224 includes a set of stationary coils which may not move or spin with movement of shaft 110. As generator rotor 222 spins with the spinning of shaft 110, the resultant magnetic field produced by field current $I_{FIELD}$ running through the rotating field coil of generator rotor 222 induces an AC current out of generator stator 224 at bus 214.

Figure 3:
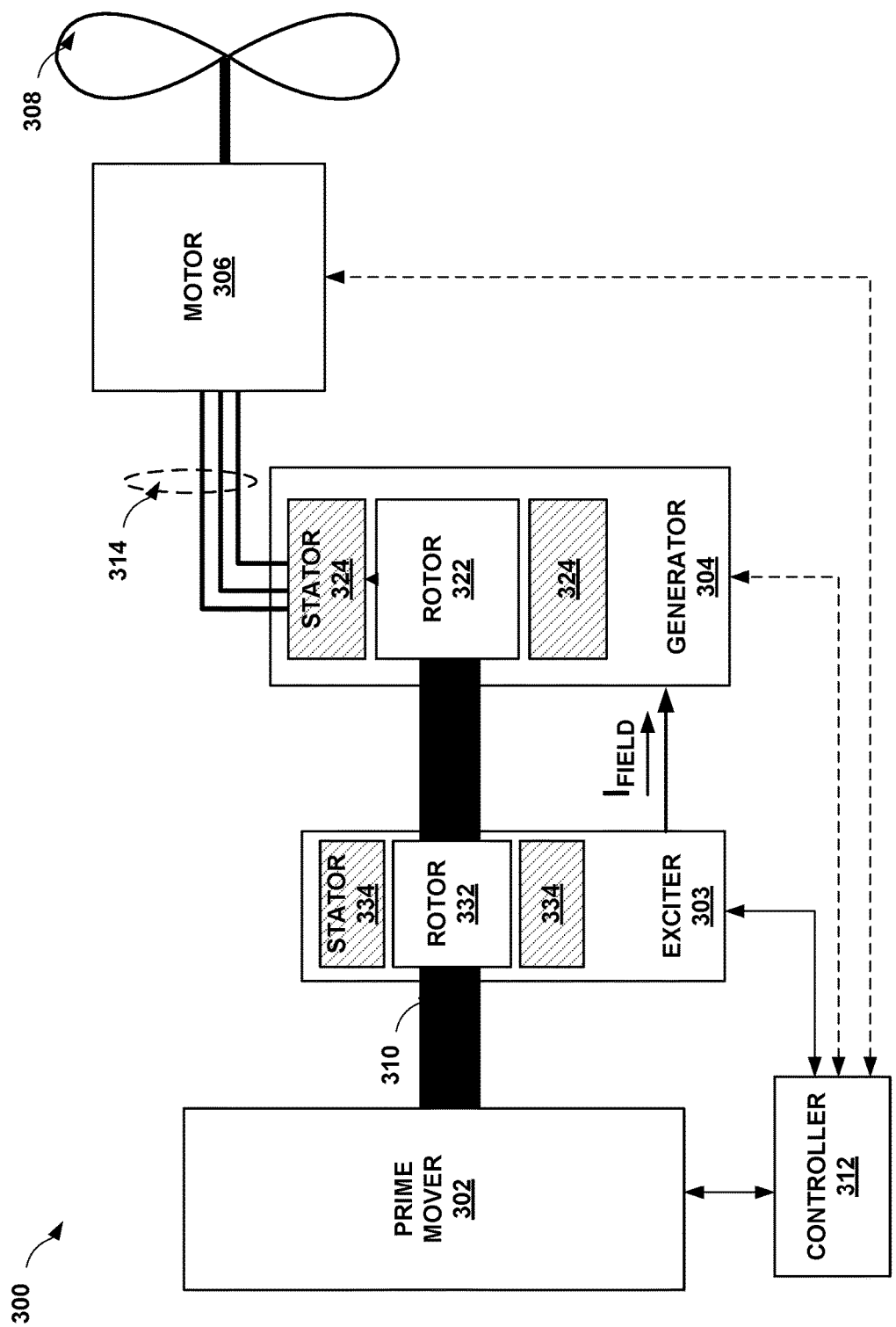
FIG. 3 is a conceptual diagram illustrating a portion of an example synchronous power system for providing electrical power from an alternating current generator to one or more motors, in accordance with one or more aspects of the present disclosure.

FIG. 3 is a conceptual diagram illustrating system 300 as a portion of an example synchronous power system, such as system 100 of FIG. 1, for providing polyphase electrical power from an alternating current generator, such as a synchronous generator, to one or more motors, such as synchronous motors, in accordance with one or more aspects of the present disclosure. For the sake of brevity and ease of description, system 300 is described within the context of system 100 of FIG. 1 and system 200 of FIG. 2. For example, exciter 303 and generator 304 of system 300 represent examples similar to, respectively, exciter 103 and generator 104 of system 100 or exciter 203 and generator 204 of system 200. Exciter 303 and generator 304 are controllable by controller 312 of system 300 which represents an example similar to the controllers 112 and 212 of systems 100 and 200.

System 300 includes prime mover 302 as an example of prime mover 102 of system 100. Prime mover 302 produces mechanical energy that spins shaft 310 which causes rotor 332 of exciter 303 and rotor 322 of generator 304 to also spin or rotate as exciter 303 and generator 304 may be both mechanically coupled to shaft 310. In other words, rotor 332 and rotor 322 may be mechanically coupled to prime mover 302 via shaft 310. In other examples, exciter 303 and generator 304 may be on separate shafts, or exciter 303 may not be a shaft driven device.

System 300 further includes motor 306 and load 308. Motor 306 is driven by a three-phase AC electrical signal output from generator 304 onto link 314. In the example of system 300, motor 306 is a synchronous propulsor motor which is mechanically coupled to load 308. In the example of FIG. 3, load 308 is a fan or a propeller, or another load having a linear torque curve. In other examples, system 300 may include more than one motor 306 and more than one load 308, including any and all other examples of motors 106 and loads 108 described above with respect to system 100.

Controller 312 of system 300 may send and receive information for controlling the speed at which shaft 310 spins, the current or voltage level at bus 314, and/or the speed at which motor 306 spins load 308. For example, controller 112 may provide a signal or command to prime mover 302 that causes prime mover 302 to spin shaft 310 with a particular speed or acceleration defined by the signal from controller 312. Controller 312 may provide a signal or command (voltage output signal) to exciter 303 that causes exciter 303 to produce a particular field current $I_{FIELD}$ in accordance with the signal or command from controller 312 that provides the exciter voltage. The field current $I_{FIELD}$ produced by exciter 303 and the speed with which shaft 310 spins may cause generator 304 to output a three-phase AC electrical signal across electrical bus 314. Motor 306 may use the AC electrical signal received via bus 314 to drive load 308.

Figure 4:
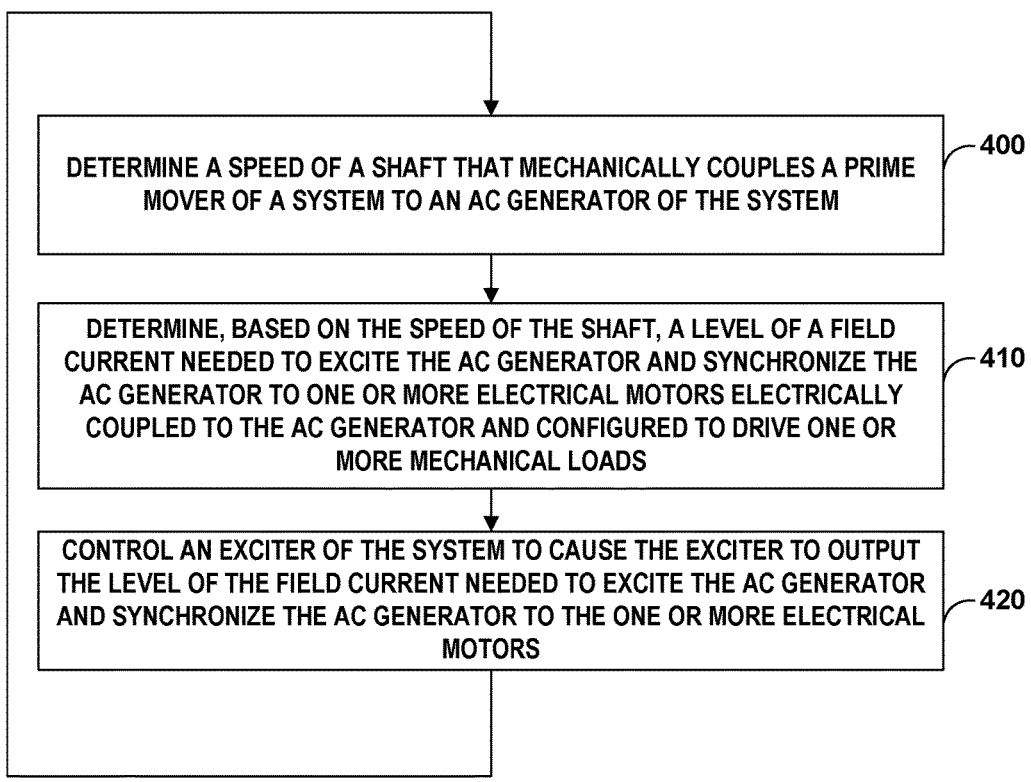
FIG. 4 is a flow chart illustrating example operations performed by a controller of an example synchronous power system for providing electrical power from an alternating current generator to one or more motors, in accordance with one or more aspects of the present disclosure.

FIG. 4 is a flow chart illustrating example operations performed by a controller of an example synchronous power system, such as system 100 of FIG. 1, for providing polyphase electrical power from an alternating current generator to one or more motors, in accordance with one or more aspects of the present disclosure. FIG. 4 is described below within the context of FIGS. 1-3. For the sake of brevity, operations 400-420 are described as being performed by controller 112 of FIG. 1 although controllers 212 and 312 may also perform operations 400-420.

Controller 112 may synchronize generator 104 to motors 106 by providing signals and commands, to prime mover 102, exciter 103, and generator 104, that carefully control the field current $I_{FIELD}$ exciter 103 provides to generator 104 and by also carefully controlling the rotational acceleration or speed of shaft 110. In other words, since controller 112 has control with respect to the start of prime mover 102 and its acceleration of shaft 110, and since controller 112 has control with respect to the field current $I_{FIELD}$ provided to generator 104, and since system 100 powers loads 108 that have a torque that increases linearly in dependence on rotational speed, then controller 112 may control system 100 through means already designed into the downstream system. As such, controller 112 may alone perform generator to load-motor synchronization without the need for additional power electronics, pony motors, and induction rotor devices that are typically used to synchronize generators to motors of other power systems.

To implement the control concept provided by controller 112, motors 106 and generator 104 may be well matched and controller 102 may control the field current $I_{FIELD}$ provided by exciter 103 to enable rotor magnetic flux at generator 104 even when shaft 110 is at substantially zero speed. In other words, with motors 106 and generator 104 being matched, the combined electrical ratings of motors 106 are within the operating capacity of generator 104, and generator 104 has sufficient capacity to produce excess (e.g., 125%) of the combined voltages required by motors 106 for short periods (e.g., 5 seconds). Substantially zero speed of the shaft 110 or generator 104 refers to the lowest speed in which the generator 104 can source sufficient terminal current to supply the very small static friction torque, negligible load torque, and torque to accelerate the moment of inertia of the motors 106 to the same electrical speed before the generator 104 rotates more than about ¼ of an electrical revolution. By controlling the speed of shaft 110 and the energizing voltage provided to exciter 103, controller 112 may be able to control the "synchronization" of motors 106 and loads 108 without additional power electronics, pony motors, and induction rotor devices. Synchronization may be controlled since when prime mover 102 and generator 104 start (e.g., as shaft 110 first begins to rotate and starts to increase from a zero speed to an operational speed over a period of time ranging from seconds to minutes) the load torques associated with corresponding motors 106 and loads 108, which are of negligible magnitude at low speeds, correspondingly increase as speed increases. Controller 112 may control system 100 based on the following theory of operations.

For controller 112 to induce a terminal voltage ($V_{GEN}$) of generator 104 (e.g., a voltage sufficient to initiate rotation of motor 106 and loads 108), during system start-up and at extremely low rotational rotor speeds (ω) of generator 104, controller 112 may energize the field coil of the stator of exciter 103 to induce a voltage with a significantly high magnitude and frequency. That is, the voltage used to energize the field coil of the stator of exciter 103 may have a combination of magnitude and frequency that causes the magnetic flux produced by the stator of exciter 103 to couple across the exciter air-gap between the stator and rotor, so as to produce a field current $I_{FIELD}$ from the rotor of exciter 103, that is sufficient for initiating and maintaining rotation of the motors 106, without exceeding the voltage rating of the exciter stator insulation. Thus, the field current $I_{FIELD}$ is capable of producing the maximum generator phase voltage at whatever rated speed the generator is rotating. For example, consider Table 1, which shows variation in field current $I_{FIELD}$ and terminal voltage $V_{GEN}$ given variations in rotor speeds (ω) and the magnitude of the exciter voltage at exciter 103. Note: The values shown in Table 1 are examples only for the purposes of illustration; actual values vary depending on system parameters and load requirements.

TABLE 1

| Exciter Voltage (V) | Exciter Frequency (Hz) | Field Current - $I_{FIELD}$ (A) | Rotor Speed - ω (RPM) | Terminal Voltage - $V_{GEN}$ @ rated speed (V) |
|---|---|---|---|---|
| 6 V | 0 | ~0 | 1 | ~0 |
| 260 V | 200 | 13 | 1 | ~0.19 |
| 200 V | 200 | 10 | 1000 | 145.5 |
| 6 V | 0 | 10 | 1000 | 145.5 |
| 200 V | 200 | 10 | 3300 (rated) | 480 |
| 2 V | 0 | 3.3 | 10000 | 480 |

According to Table 1, with an exciter voltage of 6V, 0 Hz, when a rotor speed (ω) of generator 104 is substantially zero (or low), the field current $I_{FIELD}$ out of exciter 103 may be negligible or zero, which may only be sufficient to produce a terminal voltage $V_{GEN}$ at generator 104 (e.g., which is not of sufficient magnitude to drive motors 106). On the other hand, at an exciter voltage of 260V, 200 Hz, when the rotor speed (ω) of generator 104 is substantially zero (or low), the field current $I_{FIELD}$ out of exciter 103 may be 10 A and may be sufficient to produce a terminal voltage $V_{GEN}$ of generator 104 that is approximately 0.19V (e.g., which may produce sufficient current magnitude to drive motors 106 up to the low synchronous speed).

As the rotor speed (ω) increases, the required magnitude of the exciter voltage becomes less and less, to produce a sufficient field current $I_{FIELD}$ out of exciter 103 that is sufficient to produce a terminal voltage $V_{GEN}$ of generator 104 sufficient to drive motors 106. For example, at an exciter voltage of only 200V, 200 Hz, when the rotor speed (ω) of generator 104 is approximately ⅓ the operational speed (e.g., 1000 RPM), the field current $I_{FIELD}$ out of exciter 103 may still be 10 A and may be sufficient to produce a terminal voltage $V_{GEN}$ of generator 104 that is approximately 145.5V (e.g., which may be of sufficient magnitude to drive motors 106).

Lastly, Table 1 shows that when the rotor speed (ω) of generator 104 is relatively high (e.g., at 1000 RPM or some other operational speed), an exciter voltage of only 6V, 0 Hz may produce a field current $I_{FIELD}$ out of exciter 103 of 10 A which may be sufficient to produce a terminal voltage $V_{GEN}$ of generator 104 that is also approximately 145.5V. In other words, Table 1 shows that, when the exciter voltage of exciter 103 is increased to a relatively high frequency (e.g. 200 Hz), by increasing the magnitude of the exciter voltage to sufficiently high levels (e.g., 200V), exciter 103 may produce a field current $I_{FIELD}$ that is sufficiently high (e.g., 10 A), even at substantially zero or low speed (ω), to produce a terminal voltage $V_{GEN}$ that is sufficient for driving motors 106 to begin and maintain rotation. As the rotor speed (ω) of the generator 104 increases beyond a threshold speed (e.g., ⅓ operational or ⅓ max speed), the magnitude of the exciter voltage can be reduced and still cause exciter 103 to produce a sufficiently high field current $I_{FIELD}$ to drive the motors 106. When the rotor speed (ω) reaches a predetermined rotation speed, such as an operational speed or a maximum speed, the AC component of the exciter voltage can be removed entirely and the exciter voltage can be a nominal DC voltage (e.g., 6V, 0 Hz). See FIG. 5 for a graphical view of the relationship between exciter voltage and rotor speed (ω).

The above theory of operations may enable controller 112 to re-configure exciter 103 from operating as an "inside out" field wound motor, to operating as a transformer, such as an air gap transformer. In other words, when synchronizing between the generator 104 and motors 106 as the shaft 110 is increasing from substantially zero speed up to its operational speed, controller 112 may provide an exciter voltage to exciter 103 that is of sufficiently "high magnitude and frequency" for inducing the terminal voltage $V_{GEN}$ at bus 114 that is needed to initiate and maintain rotation of motors 106 and load 108 synchronous with the increasing rotational speed of the generator 104.

In operation, referring to FIG. 4, controller 112 may determine speed of the shaft 110 that mechanically couples the prime mover 102, such as a jet engine, of the system to the AC generator 104 of the system (400). For example, during a period of time that is associated with the start-up of prime mover 102, controller 112 may provide a signal and/or command to prime mover 102 that causes shaft 110 to begin increasing from a zero speed to an operational speed. At the start of system 100, controller 112 may receive sensor information indicating a speed of shaft 110 as prime mover 102 begins mechanically spinning or rotating shaft 110. In other examples, controller 112 may infer the speed of shaft 110 based on voltage and/or current measurements taken within the system 100 (e.g., from AC generator 104, for example). In any case, this start-up phase (e.g., lasting anywhere from between zero and five seconds) also causes the rotors of exciter 103 and generator 104 to begin spinning congruently with shaft 110. While the speed of shaft 110 is at substantially zero, or at any time before shaft 110 is at a predetermined full operational or rated speed at which AC generator 104 drives each of motors 106 and loads 108, controller 112 may induce excitation in system 100 so as to cause motors 106 and loads 108 to "spin-up" or be induced (energized) to rotate in-synch with AC generator 104.

Controller 112 may determine, based on the speed of the shaft, a level of a field current $I_{FIELD}$ needed to excite the AC generator 104 and synchronize the AC generator 104 to one or more electrical motors 106 that are electrically coupled to the AC generator and are configured to drive one or more mechanical loads 108 (410). For example, controller 112 may utilize a function or a look-up table of values to determine the level of field current $I_{FIELD}$ needed by AC generator 104 to produce a terminal voltage $V_{GEN}$ at bus 114 that is of sufficient strength (e.g., magnitude and frequency) to begin turning motors 106 and loads 108 as shaft 103 spins with substantially zero or less than operational speed. In some examples, controller 112 may input the speed into a function or look-up table and determine, based on the function or look-up table, that the level of the field current $I_{FIELD}$ is at a maximum level of current when the speed of the shaft is at substantially zero speed or that the level of the field current is at a minimum level when the speed of the shaft is at an a operational speed (e.g., 3300 RPM or some other speed needed to drive AC generator 104 to produce the required $V_{GEN}$ at bus 114).

In some examples, in addition to determining the speed of the shaft 110, controller 112 may determine a power factor of the AC generator 104 and changes, over time, in the speed of the shaft 110 and the power factor of the AC generator 104. In this case, controller 112 may determine the level of the field current $I_{FIELD}$ (needed to excite the AC generator sufficiently to maintain synchronized rotation of the AC generator with rotation of one or more electrical motors that are electrically coupled to the AC generator and configured to drive one or more mechanical loads) based on the speed of the shaft 110, the power factor of the AC generator, and changes, over time, in the speed of the shaft 110 and the power factor of the AC generator. In other words, the function, look-up table, and/or algorithm that controller 112 may use to determine the field current $I_{FIELD}$ needed for a particular load condition may be dependent on more than just the rotational speed of the shaft 110. Controller 112 may input at least one of the rotational speed, the power factor, or changes in the speed and/or the power factor, into a function and/or look-up table and determine, based on an output from the function and/or look-up table, the level of the field current $I_{FIELD}$.

Controller 112 may adjust the field current $I_{FIELD}$ to maintain the power factor of the AC generator in a predetermined range, such as greater than −0.9, less than +1.1, or otherwise near 1.0, as the power factor fluctuates in the predetermined range. As the speed of the shaft 110 changes and the power factor changes, controller 112 may update its determination at any given time regarding the level of field current $I_{FIELD}$ needed to excite the AC generator and maintain the AC generator 104 synchronized to one or more electrical motors 106 that are electrically coupled to the AC generator 104 and configured to drive one or more mechanical loads 108 at the given time. In other words, the function and/or look-up table used by controller 112 may factor in changes in speed and/or power factor to cause controller 112 to adjust the field current $I_{FIELD}$ accordingly.

Controller 112 may control the exciter 103 of the system 100 to cause the exciter 103 to output the level of the field current $I_{FIELD}$ to excite the AC generator 104 and synchronize the AC generator 104 to the one or more electrical motors (420). For example, controller 112 may synchronize AC generator 104 with motors 106 by varying the level of the field current $I_{FIELD}$ being output from exciter 103 during start-up of system 100, or at any other time, in response to controller 112 determining that the speed of the shaft 110, the power factor of the AC generator 104, and/or changes, over time, in the speed of the shaft 110 and the power factor of the AC generator 104.

In any case, if controller 112 determines that due to the speed or acceleration of shaft 100, that system 100 is a candidate for synchronization via exciter field current $I_{FIELD}$ control, controller 112 may control the field current $I_{FIELD}$ using a voltage output signal or command to control the exciter voltage. Although referred to herein as a "voltage output signal," control of exciter 103 by the controller 112 to output the field current $I_{FIELD}$ may be a command, a variable excitation voltage output by the controller 112, or a control signal provided directly to the exciter 103 to create the exciter voltage, or to a power supply or other device that may directly or indirectly create the exciter voltage to induce the exciter 103 to output the field current $I_{FIELD}$. The voltage output signal may cause application of an exciter voltage to the exciter 103 that has a sufficient magnitude or frequency to induce (even when the shaft 110 is at substantially zero speed) a field current $I_{FIELD}$, and therefore a terminal voltage $V_{GEN}$, at the AC generator 104 that causes the one or more electrical motors 106 to drive the one or more mechanical loads 108. For instance, in some examples, the terminal voltage $V_{GEN}$ is a minimum voltage needed by motors 106 to accelerate loads 108 from a substantially zero speed. By utilizing the principles of Table 1, controller 112 may apply a relatively high level of exciter voltage at a relatively high frequency, to the armature of exciter 103 such that a field current $I_{FIELD}$ is induced out of exciter 103, even if shaft 110 is not spinning or spinning slowly. As the speed of shaft 110 increases to operational speed, controller 112 may reduce the magnitude of the exciter voltage back down to predetermined operating levels associated with the operational speed(s).

In some examples, controller 112 may apply the exciter voltage directly (e.g., via an internal voltage source 238) using the voltage output signal. In other examples, exciter 103 may include a variable voltage source 238 and controller 112 may control the variable voltage source of exciter 103 to output the exciter voltage based on the voltage output signal to produce a sufficiently high voltage or frequency at the field coil of exciter 103 to induce a terminal voltage $V_{GEN}$ at AC generator 104 that causes motors 106 to drive loads 108.

In some examples, controller 112 may continue to monitor the speed of shaft 110, the power factor of AC generator 104, the magnitude of the terminal voltage $V_{GEN}$, the level of field current $I_{FIELD}$ out of exciter 103, and the rotational speed or acceleration of loads 108 and dynamically adjust the amount of excitation that controller 112 applies to exciter 103 accordingly. For example, controller 112 may dynamically adjust the exciter voltage to exciter 103 by decreasing a magnitude of the exciter voltage in response to determining an increase in the rotational speed of the shaft 110 or an increase in a speed of the one or more mechanical loads. For example, controller 112 may dynamically decrease the magnitude of the exciter voltage proportionally to the level of increase in the speed of the shaft 110, or an increase in the speed of the one or more mechanical loads. In other words, at speeds where the DC excitation becomes effective, as the speed of shaft 110 increases or as the speed of the one or more mechanical loads 108 increases, controller 112 may decrease the level of exciter voltage or in some examples, may transition to modulated low voltage DC excitation, since the increasing speed of shaft 110 or the increasing of the speed of the one or more loads 108 may naturally lead to an increase in the level of field current $I_{FIELD}$ out of exciter 103, and thereby lead to an increase or maintaining of the level of the terminal voltage at bus 114.

In some examples, as also described elsewhere, controller 112 may monitor the power factor of AC generator 104 and dynamically adjust the field current by adjusting the magnitude or frequency of the exciter voltage so as to substantially maintain unity power factor. As used herein, substantially maintaining unity power factor refers to maintaining the power factor within a predetermined range of unity such as +/−0.1, such that the power factor ranges from 0.90 lagging to 0.90 leading. For example, controller 112 may dynamically vary the excitation voltage magnitude and frequency to increase the field current $I_{FIELD}$ to move the power factor to the lagging region (e.g., in response to determining the power factor is greater than one or "leading"). Conversely, controller 112 may dynamically vary the excitation voltage magnitude and frequency to decrease the field current $I_{FIELD}$ to move the power factor to the leading region (e.g., in response to determining the power factor is less than one or "lagging").

In some examples, controller 112 may apply the excitation voltage to the exciter, so as to induce a field current $I_{FIELD}$ and terminal voltage, at low speeds by setting the magnitude of the exciter voltage to a maximum voltage when the speed of the shaft is at substantially zero speed and setting the magnitude of the exciter voltage to a minimum voltage when the speed of the shaft is at an operational speed. In other words, controller 112 may utilize the principles of Table 1 and as described above to use a relatively high magnitude and frequency exciter voltage when the speed of shaft 110 is low (e.g., less than operational speed) and use a lower magnitude and frequency exciter voltage when the speed of shaft 110 is high (e.g., at operational speed).

By energizing exciter 103 with a particular high level and high frequency voltage in this way, controller 112 may control the field current $I_{FIELD}$ output from exciter 103 even at low rotational speeds. Controller 112 may control exciter 103 using a speed independent exciter armature or exciter voltage, and therefore, dynamically control the field current $I_{FIELD}$ providing the magnetic flux of the rotor of generator 104 so as to permit a significant terminal voltage $V_{GEN}$, even at very low shaft speeds. The significant terminal voltage $V_{GEN}$ may induce current flow in the attached load motors 106 and thus torque, thereby accelerating load motors 106 to match the electrical speed of generator 104.

As the components of system 100 spin-up to a predetermined operational speed, the exciter field energizing voltage may increase in frequency, decrease in AC magnitude, and an additional DC component may increase. Near operational speed, the AC component of the exciter field voltage may be eliminated and controller 112 may use techniques, such as power factor control, to control the DC component to ensure continued synchronization of load motors 106 under varied load conditions.

Figure 5:
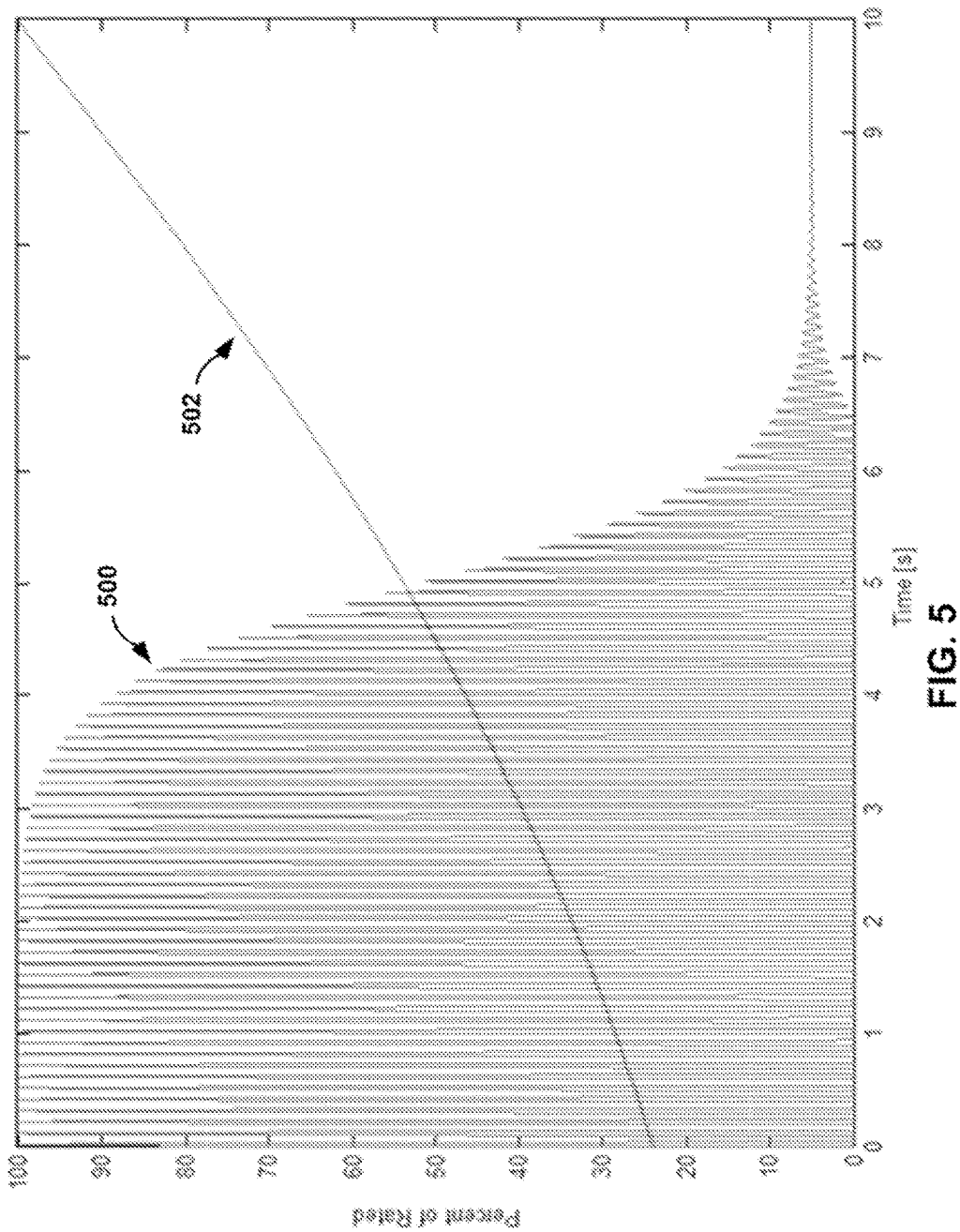
FIG. 5 is a diagram illustrating a variable exciter voltage as compared to rotor speed of an example synchronous power system for providing electrical power from an alternating current generator to one or more motors, in accordance with one or more aspects of the present disclosure.

FIG. 5 is a diagram illustrating a variable exciter voltage 500 as compared to rotor speed (ω) 502 of an example synchronous power system, such as system for providing polyphase electrical power from an alternating current generator to one or more motors, in accordance with one or more aspects of the present disclosure. For example, with reference to Table 1, FIG. 5 shows the variable exciter voltage 500 delivered to an exciter, such as exciter 103, being at 260V, 200 Hz when the rotor speed (ω) 502 of a generator, such as generator 104, is low or (substantially zero RPM). As the rotor speed (ω) 502 of generator increases, a controller, such as controller 112, may decrease the magnitude of the exciter voltage. For instance, when the rotor speed (ω) 502 of generator reaches approximately 1000 RPM or ⅓ its operational speed, controller 112 may apply a 100V, 200 Hz exciter voltage to the exciter. And eventually, once the rotor speed (ω) 502 of generator reaches approximately 3300 RPM and higher, up to is maximum operational speed, the controller may decrease the magnitude of exciter voltage further, eventually only applying only a minimal 5V, 0 Hz exciter voltage to the exciter.

In examples where the generator includes a relatively high impedance when compared to a relatively low impedance of motors, such as motors 106, the voltage at the output of the generator may be largely dictated by the motors. For example, the impedance of the generator may be three or four per unit (p.u.) and the impedance of the motors, as viewed from the generator may be one or two p.u. In such examples, changes in the exciter voltage supplied to the generator may result in changes in a magnitude of current output of the generator with relatively little change in voltage output of the generator. In addition, a relatively high per unit generator with relatively low per unit load motors and fixed exciter current may have a significantly reduced increase in power with motor electrical displacement angle.

During a startup condition, such as when the speed of the generator is substantially zero and first begins to rotate, or at rotational speeds of less than full speed, such as less than 50% of rated speed of the generator, the motors and the generator may be synchronously rotating. Under these conditions, the synchronous coupling, or magnetic coupling, between the generator and the motors may be a relatively "loose" coupling or a relatively low "stiffness" in the magnetic coupling of the generator rotor and the motor rotors due to the low rotational speed conditions. (e.g. low change in electrical torque transfer with electrical angle of displacement of motor(s) with respect to generator) For example, a high per unit generator with low per unit load motors and fixed exciter current may have a significantly reduced increase in power with motor electrical displacement angle.

As described herein, a "loose coupling" or "stiffness" refers to the capability of the rotors of the motors and the generator to maintain electrical phase synchronization during changing operating conditions, such as perturbations within the system 100. Such perturbations or disturbances may be, for example, a result of changes in the load, such as load 108, on one or more motors, changes in rotational speed of the generator, and/or changes in the field current supplied to the generator. Examples of other changing operating conditions may include changes in the rotational speed of both the generator 104 and corresponding synchronized motors 106. The robustness of the magnetic coupling due to synchronization of the generator rotor and the motor rotors may be affected by system operating conditions such as the rotational speed, the magnitude of current flow to the motors, and the power factor angle. As the rotational speed of the generator 104 increases, and/or the current flow to the motors 106 increases, the magnetic coupling between the generator 104 and the motors 106 may increase in stiffness making a loss of synchronism between the generator 104 and the motor 106 less likely to occur. In addition, a power factor angle between the voltage and current that is lagging may result in a stiffer coupling when compared to, for example, a unity power factor.

After synchronization of the generator with the motors, such that rotational speeds are substantially equal, changes in system operating conditions may result in mechanical modes occurring at one or more resonant frequencies of rotating inertia of the load that coincides with a phase delay of the inductance of the generator. A mode may be self-sustaining and reinforce decoupling action between the generator and the motors. Modes may occur at any frequency where the system is underdamped. Under underdamped system conditions, torque oscillations (or torque ripple) may develop between the generator and the motors, and be reinforced at the motors 106 such that the power angle between voltage and the current being supplied at the output of the generator 104 begins to oscillate creating a resonant mode. The torque oscillations and corresponding changes in the power angle may occur at a subharmonic frequency to the frequency of the voltage and current. As the rotational speed of the generator and synchronized motors changes, such as during a ramped speed system startup, different power angle oscillations (and corresponding torque oscillations) may occur at different sub-harmonic frequencies.

Figure 6:
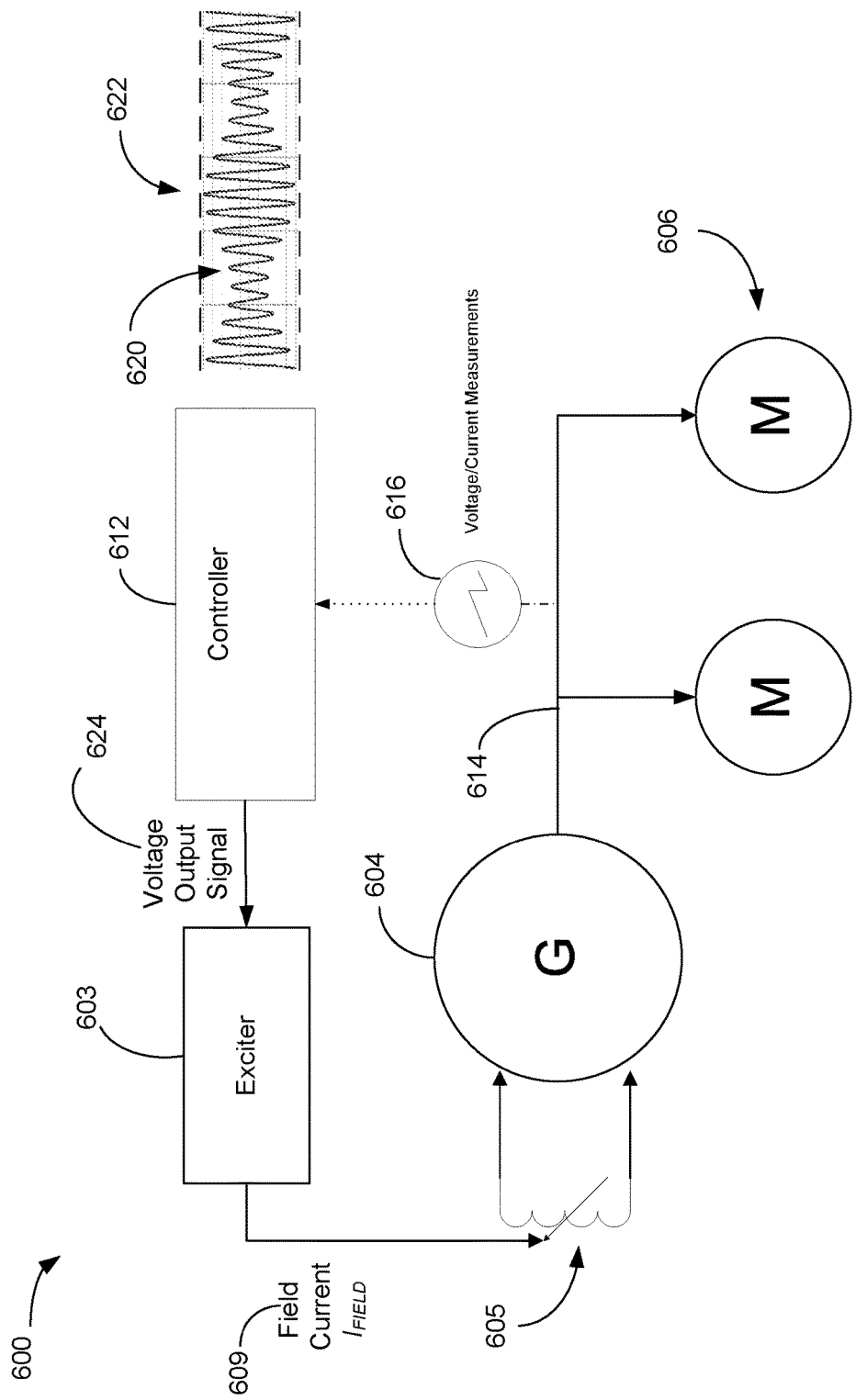
FIG. 6 is a conceptual diagram illustrating a portion of an example synchronous power system for providing electrical power from an alternating current generator to one or more motors, in accordance with one or more aspects of the present disclosure.

FIG. 6 is a block diagram of an example system 600 that includes a generator 604 having a rotor 605 and providing a voltage and current (polyphase electrical power) at an output 614 of the generator 604 in accordance with a field current $I_{FIELD}$ 609 supplied by an exciter 603 as controlled by a controller 612 to supply motors 606, such as synchronous motors that are driving loads. For the sake of brevity and ease of description, system 600 is described within the context of system 100 of FIG. 1, system 200 of FIG. 2 and system 300 of FIG. 3. For example, exciter 603 and generator 604 of system 600 represent examples similar to, respectively, exciter 103 and generator 104 of system 100 or exciter 203 and generator 204 of system 200 or exciter 303 and generator 304 of system 300. Exciter 603 and generator 604 are controllable by controller 612 of system 600, which represents an example similar to the controllers 112 and 212 and 312 of systems 100 and 200 and 300.

The controller 612 may monitor the voltage and/or current of two or more phases at the output 614 of the generator 604 using a sensor 616. The output 614 may also be considered the system bus, or system voltage and current. The sensor 616 may be a current transformer (CT), a potential transformer (PT) or any other form of voltage and/or current measurement device capable of outputting measurement signal(s) to the controller 612. Based on the sensed voltage and/or current, the controller 612 may identify torque oscillations between the generator 604 and the motors 606 within a mode at a sub harmonic frequency. In other examples, torque oscillations within a mode may be identified by the controller 612 from other sensed inputs provided by other forms of sensors, such as a position sensor for the shaft 110 of the generator 604. The subharmonic frequency of a mode may be below the rotational speed of the shaft 110 and corresponding AC frequency of the sensed voltage and current. For example, the subharmonic frequency can be low, such as 1 to 4 Hz, when the frequency of rotation of the shaft (the voltage and current frequency) is much higher, such as 300 or 400 Hz.

An example in FIG. 6 includes the voltage or current signal 620 illustrated at a relatively high frequency and the sub harmonic frequency being within a subharmonic envelope 622 at a relatively low frequency. Any number of resonant modes may occur at different resonant sub harmonic frequencies during the ramped speed startup of the generator 104 and motors 106. Occurrence of such sub harmonic frequencies may be dependent on, for example, machine parameters such as moments of inertia, internal impedance, and distribution impedance. In addition, sub harmonic frequencies may be any frequency less than the frequency of the voltage and current.

During one of these resonant modes, current demand by the motors 606 may correspondingly oscillate due to the effect of the oscillation of the power angle and the corresponding complex power requirements of the motor 606 (e.g. oscillatory changes in reactive power (VAR) requirements at the motor). Due to the oscillations in the corresponding power angle and complex power at the resonant frequency, if the generator 604 and the motors 606 are loosely magnetically coupled, the magnitude of the oscillations may increase until one or more of the motors 606 lose synchronization with the generator 604 such that the generator 604 and one or more of the motors 606 are no longer magnetically coupled. The loss of synchronization may also be referred to as "slipping a pole" since the poles of the generator rotor and the poles of the motor rotor are no longer electrically magnetically coupled between corresponding poles. As an example analogy for understanding by the reader, the synchronous operation of the generator 604 and motors 606 can be viewed as an "electronic mass spring damper" that is either underdamped, overdamped, or critically damped at a given frequency. As such, variations in synchronization between the generator 604 and motors 606 during an underdamped condition can be thought of as being analogous to changes in the loading of a mechanical spring. Such variations in the synchronization (spring loading) may be reduced or damped by damping the oscillations of the power angle (and corresponding oscillations in torque loading) so as to avoid loss of synchronization conditions when the system is otherwise underdamped.

Damping of the power angle oscillations may be performed using the controller 612 and the exciter 603 by selective changes of the field current $I_{FIELD}$ at the exciter 603 to counteract the power angle oscillations and resulting torque oscillations. The controller 612 may dynamically modulate a level of a voltage output signal 624 supplied to the exciter 603 (directly or indirectly) to correspondingly increase and decrease the stiffness of the coupling between generator 604 and the motors 606. The timing by the controller 612 for increasing and decreasing the stiffness of the coupling may be at substantially the same frequency as the resonant frequency of a mode such that the torque oscillations and corresponding oscillations in the power angle during the mode are damped, or reduced. Modulation of the voltage output signal may be timed by the controller 612 with respect to the phasing of the current output by the generator 604 such that increases in the level of the voltage output signal are 180 degrees out of phase with the phasing of the current/voltage inducing the undesirable power angle oscillations (torsional oscillations) in order to provide a canceling or counteracting effect and thereby actively damp out the oscillations. Thus, modulation of the voltage output signal may have the effect of changing the system from be critically damped or underdamped to being over damped.

Figure 7:
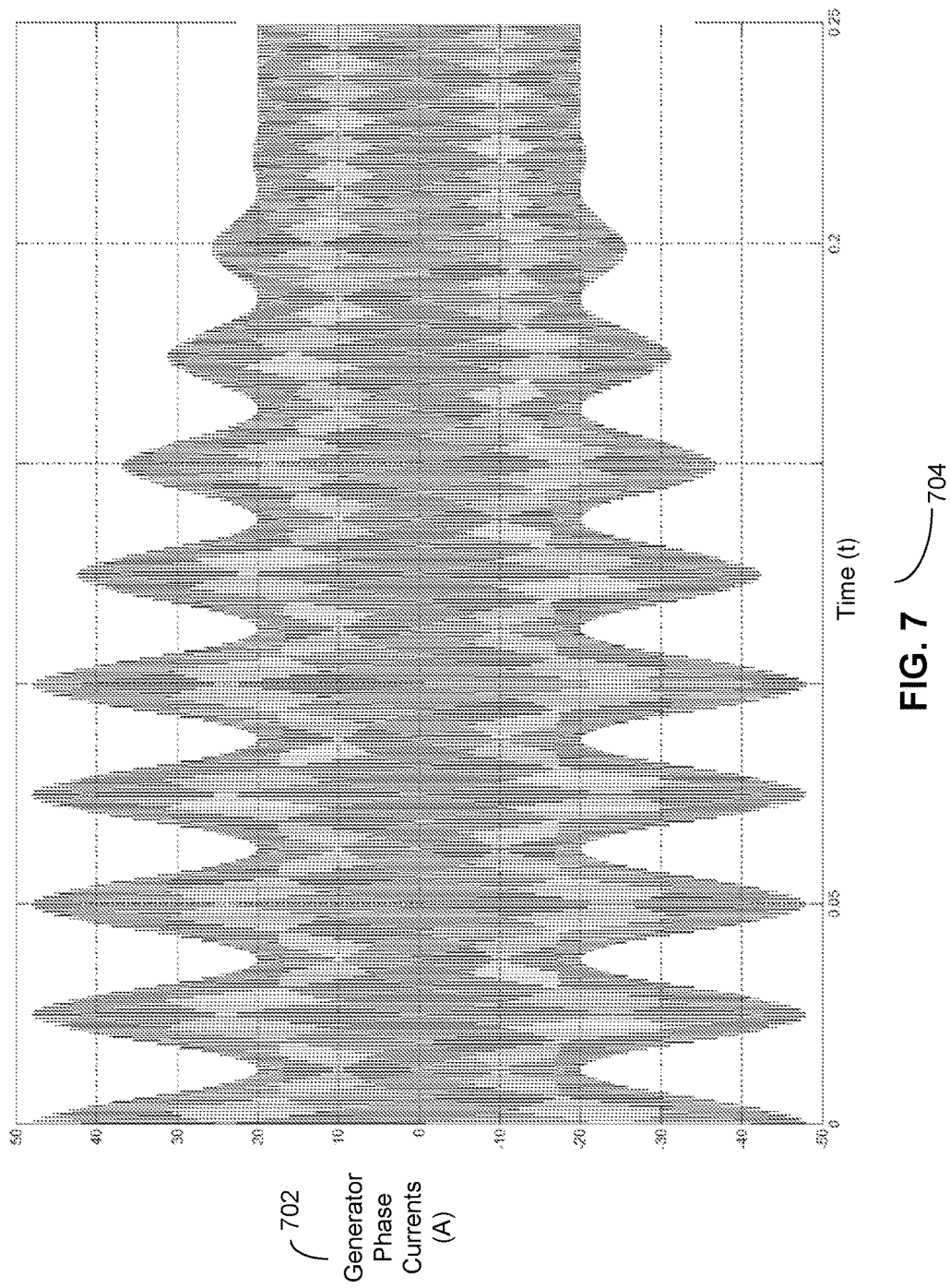
FIG. 7 illustrates an example graph of the effect of damping sub-harmonic currents.

Damping of the power factor, power angle, or reactive power oscillations may effectively damp out sub-harmonic oscillations in the terminal currents of the generator 104. FIG. 7 illustrates an example graph of the effect of damping sub-harmonic currents. In FIG. 7, generator phase currents on the y-axis 702 are damped over a period of time illustrated along the x-axis 704. In the illustrated example, at time t=0 until time t=0.1, there are relatively large sub-harmonic oscillations in power factor (power angle). In this example, the power factor is initially oscillating between approximately 100% and 42% (i.e. power angle between 0 degrees and 65 degrees lagging). When active damping is enabled at about time t=0.1 to t=0.25, the power angle oscillations are reduced and the power angle is stabilize at a desired 0 degrees (for this example). This example is for purposes of explanation only, and may not represent the power angle oscillation levels, frequencies, power factors, etc. of a particular system, and therefore does not limit the scope of the present disclosure.

Determination by the controller 612 of the level of the field excitation to be applied to the exciter 603 may be based on a determination of a desired reactive power, power angle or power factor. The desired reactive power, power angle or power factor may be determined based on system operating conditions and/or objectives. For example, it may be desirable for the system to substantially maintain zero reactive power (unity power factor), or some non-zero amount of reactive power at full rated speed. The desired reactive power, power angle or power factor may be a fixed value independent of system operating conditions, such as rotational speed of the generator 604. Alternative, the controller 612 may dynamically determine the desired reactive power, power angle or power factor based on system operating conditions, such as rotation speed of the generator 604.

In some examples of system operation, the controller 612 may use a lookup table to dynamically determine a desired reactive power, power angle or power factor. In other examples, modeling, adaptive control, fuzzy logic or any other control scheme may be used to dynamically determine a desired reactive power, power angle or power factor for the system.

Table 2 is an example of a table for dynamic determination by the controller 612 of a desired power angle using the voltage and current measured, for example, by the sensor 616 at the output of the generator 604. In other examples, Table 2 could be used to determine a desired power factor or reactive power or other desired parameter. In Table 2, a magnitude of the voltage and current output by the generator 604 are inputs to the controller 612, which are multiplied to determine a total apparent power (kVA) along a vertical axis in Table 2. In addition, a horizontal axis in Table 2 provides the voltage magnitude of the output voltage of the generator 604 at the output 614. In example systems where system voltage is dominated by low-impedance synchronous loads, such as permanent magnet motors, the voltage may be proportional to speed of rotation of the shaft of the generator 604. In other examples, the rotational speed of the generator 604, or some other parameter indicative of speed may be used.

In this example, as indicated in Table 2, the desired power angle becomes progressively closer to zero (power factor becomes closer to unity) as power increases, since efficiency is improved at higher generator power output resulting in tighter magnetic coupling between the generator 604 and the motors 606. At lower power levels, a progressively more lagging power factor is provided in this example to leave greater margin in the stiffness of the magnetic coupling between the generator 604 and the motor 606 to allow for potential load imbalances. In this example, the desired power factor also becomes closer to one as speed increases. This is because in this example system, the magnetic coupling between generator rotor and load rotors is determined to be stiffer at higher speed, so that greater torque margin is provided.

TABLE 2

| Reference Lagging Power Angle (deg) | |V| (Volts) | | | | | | |
|---|---|---|---|---|---|---|---|
| | | 10 | 50 | 100 | 200 | 350 | 600 | 1000 |
| |V| * |I| (kVA) | 1 | 48 | 45 | 42 | 39 | 36 | 33 | 30 |
| | 5 | 44 | 40.8 | 37.7 | 34.5 | 31.3 | 28.2 | 25 |
| | 10 | 40 | 36.7 | 33.3 | 30 | 26.7 | 23.3 | 20 |
| | 20 | 36 | 32.5 | 29 | 25.5 | 22 | 18.5 | 15 |
| | 35 | 32 | 28.3 | 24.7 | 21 | 17.3 | 13.7 | 10 |
| | 60 | 28 | 24.2 | 20.3 | 16.5 | 12.7 | 8.8 | 5 |
| | 100 | 24 | 20 | 16 | 12 | 8 | 4 | 1 |
| | 200 | 6 | 5 | 4 | 3 | 2 | 1 | 0 |

Figure 8:
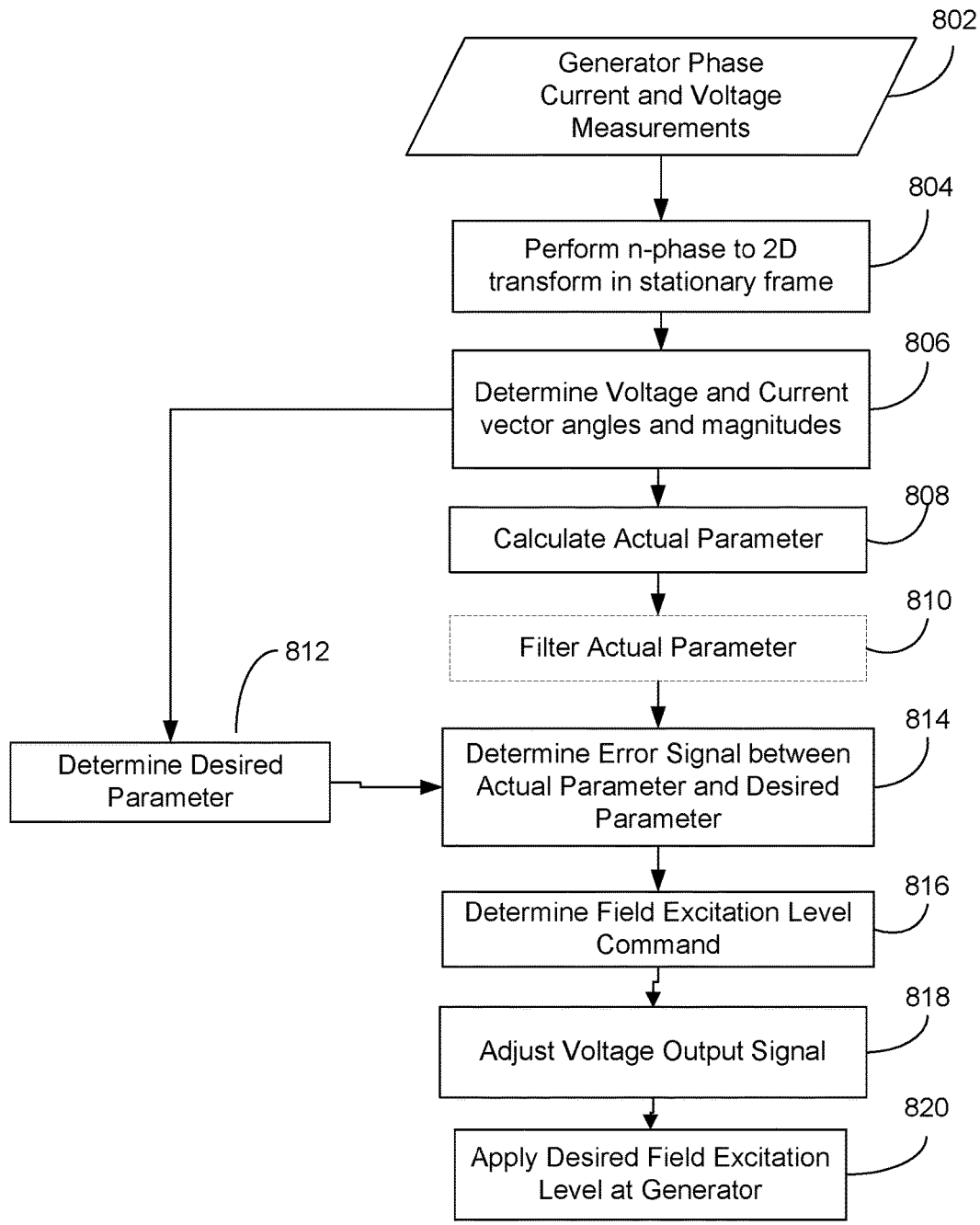
FIG. 8 is an operational flow diagram example of actively damping power angle oscillations.

FIG. 8 is an operational flow diagram example of actively damping power angle oscillations (torque oscillations) that is applicable to any of the system described, however, for ease of understanding, reference will be made to FIG. 6 unless otherwise noted. During operation, voltage and current may be sensed by at the generator terminals 604 by a sensor 616. (802) The voltage and current signals from the sensor 616 may then be transformed such as by Clark's transform (α,β) for a fixed frame of the stator to obtain two-dimensional Cartesian coordinates. (804) For example, in a Clark's transformation, current differences between phase sets may be transformed into their own two dimensional (2D) stationary frame. Using the two-dimensional Cartesian coordinates, the magnitude and vector angles for the voltage and current may be determined, using, for example, arctan functions with appropriate filtering, or with a phase-locked loop to track angles. (806) The controller 612 may use oscillations between the voltage and current vector angles, to identify corresponding torque oscillations. The viability of different approaches to obtain the magnitude and vector angles for the voltage and current may be dependent on other factors, such as voltage/current sensor quality, or processing power.

If, for example, a position sensor providing the shaft position of the generator 604 was provided to the controller 612, such that the position of the rotor was known by the controller 612, a Park's transform could be used in which the quadrature axis (q) provides the torque producing component and the direct axis (d) provides the reactive component. Oscillations in the reactive component could then be used by the controller 612 to identify corresponding torque oscillations. In FIG. 8, the use of sensed voltage and current is described, however, it should be understood that other sensed parameters, such as the shaft position may also be used by the controller 612 to detect and damp power angle oscillations and corresponding torque oscillations.

Using, for example, the vector angles, and magnitudes of the voltage and current, an actual parameter, such as the actual power angle, reactive power and/or power factor at the present shaft speed may be determined. (808) Filtering of the actual parameter, such as the reactive power, power angle, or power factor term may optionally be applied by the controller 612. (810) In example configurations, the controller 612 may provide one or more filters. Alternatively, or in addition, one or more separate and independent filter devices may be controlled by the controller 612.

Filtering may be applied to the actual parameter depending, for example, on the bandwidth of controller 612 in controlling the exciter 603 and/or the desired feedback characteristics. For example, frequency filtering may be applied so the controller 612 is focused on oscillations in sub harmonic frequencies where modes are likely to occur, such as in a predetermined range of frequencies. Thus, the frequency filtering may be a notch filter, low pass filter, high pass filter, or a filter may be omitted if the entire frequency spectrum is used, or the controller 612 is capable of focusing on the desired sub-harmonic frequencies.

If implemented, the goal of any such filtering is to ensure any un-desirable oscillation frequencies of the actual parameter are passed through the filter so they can be cancelled with regulation using the exciter 603. Frequencies, or ranges of frequencies, which should not be considered by the controller 612 to determine the voltage output signal 624 can be blocked by the filtering, which may improve stability of the control loop. In some examples, the controller 612 may dynamically apply filtering in accordance with an operational parameter, such as the speed of the shaft, the magnitude of output current from the generator 604, or the magnitude of the voltage at the generator output 614. Alternatively, or in addition, the filter may include one or more fixed filters that are dynamically switched in and out by the controller 612 based on operational parameters. Alternatively, or in addition, the filter may be one or more filters that are fixed and consistently applied to the actual parameter.

The determined voltage and current vector angles and magnitudes may be used as variables by the controller 612 to determine a desired parameter, such as a reactive power, power angle or power factor value that results in an over damped condition in a given system at the present shaft speed. (812) For example, the variables may be used to track zero reactive power (unity power factor), or some non-zero amount of reactive power based on system objectives and conditions. A "desired parameter" may be system specific and may vary from system to system depending on the particular system configuration and characteristics.

In example operation, the controller 612 may determine a magnitude of KVA as a variable based on the absolute value of the measured voltage and current. The controller 612 may use the determined KVA and measured voltage in conjunction with Table 2 to dynamically determine the desired parameter as a desired power angle, as the speed of the shaft dynamically changes. The dynamically determined desired power angle may be used as a first setpoint for the system.

In other examples, models, adaptive control, fuzzy logic, or any other decision based process or mechanism could be used to determine the desired parameter used as the first setpoint for the system.

Using the desired value as the first setpoint, and the dynamically changing calculated actual parameter (filtered or unfiltered), the controller 612 may determine an error signal using an actual parameter regulator included in the controller 612. (814) The error signal may represent power angle oscillations due to differences between the desired parameter and the actual parameter varying at one or more sub-frequencies. The error signal may be used by the controller 612 to determine a field excitation level command. (816) The field excitation level command may be used as a second setpoint to regulate the reactive power, power angle or power factor to damp power angle oscillations and corresponding torsional oscillation. In an example, the field excitation level command may be expressed as an RMS exciter current. The actual parameter regulator may include a dynamic feedback controller such as proportional integral derivative (PID) controller, a lead-lag controller, an adaptive controller or model-based controller. Alternatively, or in addition, the actual parameter regulator may regulate the actual parameter by operation as a neural network, fuzzy logic, or any other form of controller scheme. The actual parameter regulator may be tuned so that any un-desirable oscillations in power angle, reactive power, or power factor are damped out with application of field excitation in such a way that oscillation energy is removed.

The determined field excitation level command is used by the controller 612 to dynamically adjust the voltage output signal 624 to counteract undesirable power angle oscillations and corresponding torque oscillations. (818) The dynamically adjusted voltage output signal 624 results in the exciter 603 applying a desired field excitation level at the generator. (820) As described in detail elsewhere, voltage output signal 624 is dynamically adjusted in accordance with the sub-frequency at which power angle oscillations have been identified by the controller 612 to correspondingly adjust the exciter voltage and corresponding output current of the generator 604. As such, the dynamic adjustment of the output current of the generator 604 at the sub-frequency has the effect of damping oscillations of the power angle and corresponding torque oscillations at the sub-frequency.

Figure 9:
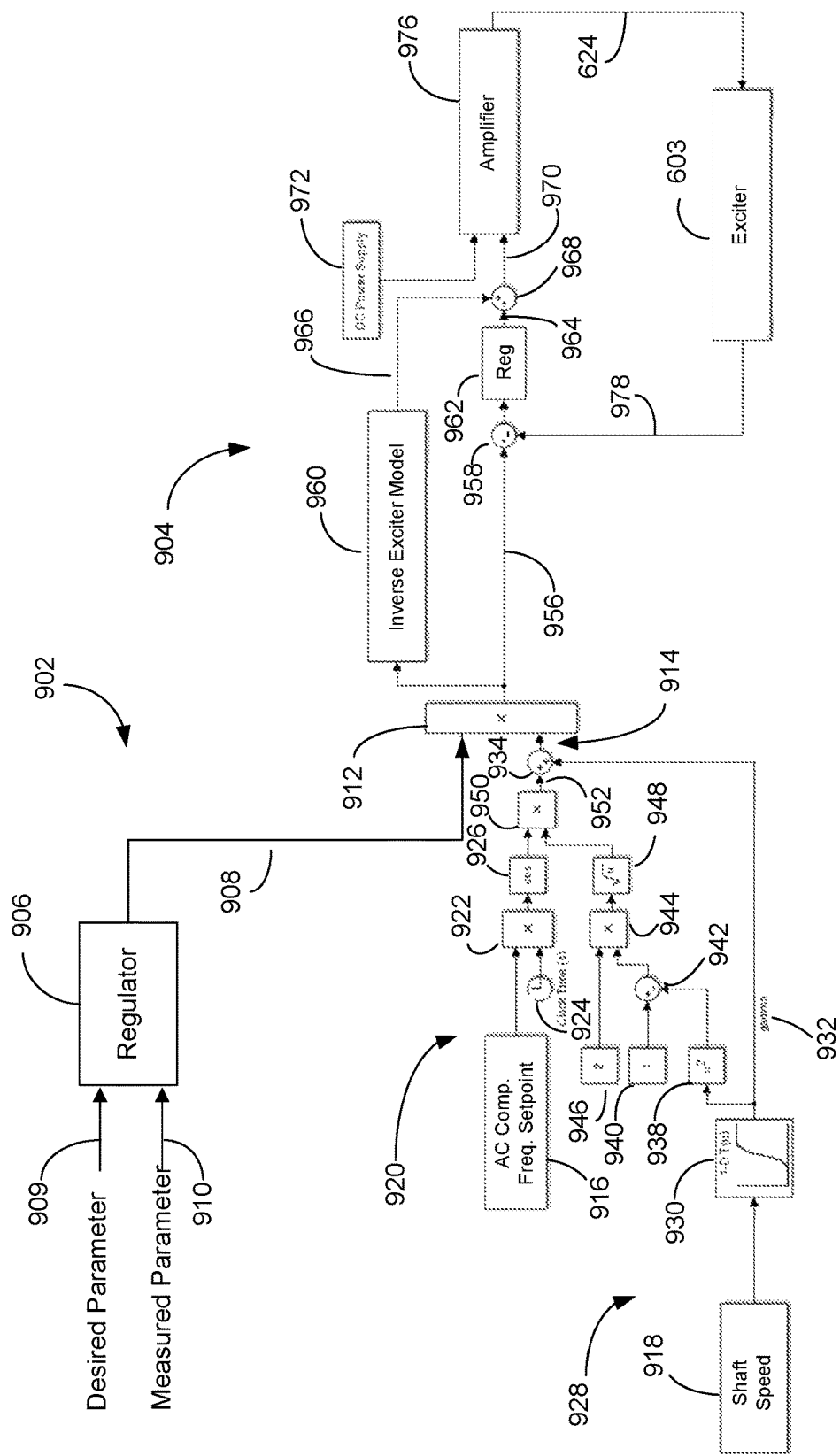
FIG. 9 is a block diagram illustrating operation of a controller in an example configuration for dynamically adjusting the voltage output signal.

FIG. 9 is a block diagram illustrating operation of the controller 612 in an example configuration for dynamically adjusting the voltage output signal 624. In FIG. 9, the configuration of the controller 612 is illustrated as having an outer control loop 902 and an inner control loop 904. In other examples, the controller 612 may be configured as a single multi-input control loop, or additional control loops. In addition, implementation of the controller 612 to dynamically adjust the voltage output signal 624 may be accomplished in any number of ways to meet the described functionality, configuring the controller 612 as a state-space based controller, a nonlinear controller, a model-predictive controller, fuzzy-logic or neural network controller, or any other form of controller that can accomplish the described functionality.

The configuration in FIG. 9 illustrates an example of regulation of the power angle and generator field excitation in which the bandwidth of the inner control loop 904 may be made sufficiently faster than the outer control loop bandwidth 902 in order to maintain suitable phase margin for stability and robustness purposes. The outer control loop 902 includes a regulator 906, such as a PID controller or lead-lag based controller. The regulator 906 may provide the error signal 908, which may be the difference between the desired parameter 909, such as a desired power angle, and the measured parameter 910, such as a measured power angle. The error signal 908 output by the regulator 906 may be the field excitation level, which may be expressed as an RMS exciter current command.

The regulator 906 may operate in a determined bandwidth of frequencies. If the bandwidth of the regulator 906 (combined with the bandwidth of any filtering done on the measurements) is sufficient to act on the oscillatory frequencies identified as a mode, the regulator may be tuned to damp power angle oscillations in a stable manner. Alternatively, or in addition, system models may be used instead of or in addition to PID or lead-lag control to increase performance using model-based control methods. Other example control architectures include model-reference adaptive control, L1 adaptive control, H-∞ adaptive control, fuzzy logic, and neural network.

The inner loop control 904 may receive the error signal 908 at a multiplier 912. The multiplier 912 may also receive an AC/DC component 914 of the excitation signal. The AC/DC component 914 of the excitation signal 914 is developed based on an AC compensation frequency setpoint 916, such as in rad/s, and a shaft speed 918 of the generator 604 to transition between an AC signal and a DC signal.

An AC component generator 920 may generate an AC component of the excitation signal. The AC component generator receives the AC compensation frequency setpoint 916, which may be multiplied at a multiplier 922 by a clock signal provided by a system clock 924 and converted from radians to a time varying unitary magnitude sinusoid by a converter 926 to generate a per unit AC sinusoidal component contribution to the exciter voltage.

A DC component generator 928 may generate a DC component of the excitation signal. The DC component receives the shaft speed 918, which may be a measured shaft speed provided by a shaft speed sensor, or an estimated shaft speed determined by the controller 612 based on other system parameter(s) such as the stator voltage frequency of the generator 604. An actual shaft speed measurement may be provided by a sensor such as speed sensor on the generator 604. An estimated shaft speed may be determined, for example, based on phase-locked loop tracking of the current or voltage angle waveforms at the output 614 of the generator 604, a "sensor-less" speed estimation algorithm using the voltage and current measurements at the output 614 of the generator, or a magnitude of generator terminal voltage, which may be approximately proportional to speed in some systems. In other example systems, the shaft speed may the exciter 603 shaft speed instead of the generator shaft speed. The shaft speed 918 may be used to determine a DC component contribution to the exciter voltage in connection with a DC component contributor 930.

In this example, the DC component contribution to the exciter voltage may be determined from a table using the shaft speed, such as a table of DC component contribution v. shaft speed. As further discussed elsewhere, the DC component contribution may be dynamically changed in accordance with changes in the speed of the exciter to transition between a DC exciter voltage and an AC exciter voltage. The DC component may be represented with a gamma value 932 in a predetermined range, such as between zero and one, where one indicates a fully DC exciter voltage signal, and zero represents a fully AC exciter voltage signal.

In other examples, other measurement/calculation technique may be used to determine the DC component contribution in the exciter voltage.

In addition to being supplied to a summer 934, the gamma value 932 may also be provided to a u^2 938 for use in generation of the AC component contribution. The output of the u^2 938 may be subtracted from a first constant (1) 940 at a difference 942, and an output of the difference 942 may be provided to a multiplier 944 where it is multiplied by a second constant (2) 946 and output to a square root 948. The output of the square root 948 may provide the peak in per unit of desired AC exciter current to be multiplied by the time varying per unit sinusoid at a multiplier 950 to provide the resulting time varying sinusoidal per unit current command component 952. The time varying sinusoidal per unit current command component 952 may be summed at the summer 934 with the gamma value 932 to form the AC+DC per unit current command component 914 of the excitation signal. The AC+DC per unit current command component 914 is calculated such that the effective root of the mean of the square is equivalent, independent of the DC component magnitude. The output of the multiplier 912 may be an exciter instantaneous current command 956, provided in units such as amps, which may be provided to a summer 958 and an inverse exciter model 960 as a current command. In this example, a regulator 962, such as a PID controller, is used in conjunction with the inverse exciter model 960 to generate the voltage output signal. An output signal 964 of the regulator 962 may be summed with an output signal 966, such as a required voltage signal, of the inverse exciter model 960 at a summer 968 to provide a terminal voltage command 970.

The output signal 966 of the inverse exciter model 960 may serve as a feed-forward term in order to increase response rate of the controller 612 in instances where the controller 612 may not have the bandwidth to otherwise operate at a sub frequency where a mode is identified. In this capacity, the inverse exciter model 960 may provide a voltage output that is summed with the output signal 964 of the regulator 962. The voltage command may be limited based on the voltage available from a supply of DC voltage, such as a DC power supply 972. In addition, anti-windup protection may be used in the regulator 962.

The voltage command 970 and the supply of DC voltage may be provided to an amplifier 976, such as an H-bridge. The amplifier 976 may be controlled by the controller 612 to amplify the voltage command 970 using the DC voltage to produce the desired voltage output signal 624, which is provided to the exciter 603. In an example, an H-bridge may be controlled by the controller 612 to perform PWM modulation to produce the desired output voltage 624 at the terminals of the brushless exciter 603. A measurement of the exciter current from the exciter 603, which may also be a terminal voltage input, may be used as a feedback term to calculate an exciter current error signal 978 provided to the regulator 962. In another example, the current measurement may also be used to dynamically update parameters of the inverse exciter model 960 such that the inverse exciter model 960 would be capable of more quickly and accurately converging to voltage level required for a particular subfrequency.

In some examples, based on voltages available and bandwidth requirements, it may also be advantageous to account for phase delay between the voltage output signal and the current response of the exciter 603. Accounting for phase delay may be accomplished by estimation of what this phase lag may be using the inverse exciter model 960. The estimate may be dynamically determined during changing operating conditions, or may be a predetermined time constant, such as an off-line calculated time constant, depending on system sensitivities. Since an AC portion of the exciter current command 956 is periodic at a known fixed frequency, a lagging time constant corresponding to an integer multiple of this period minus the modelled exciter lag time constant (using the smallest integer multiple required to still get a positive lagging time constant) could then be applied to the error signal input into the regulator 962. Effectively, this may allow the regulator 962 to track a 'future' current exciter instantaneous current command by assuming there is little change in the exciter instantaneous current command value from cycle to cycle. In some example systems, the AC proportion of the excitation current frequency may typically be 200 Hz or greater, and the fundamental power angle oscillation frequencies (generator oscillation frequencies) to damp out may be in the 10's of Hz or lower, so there may be sufficient phase margin for the assumption of little change in the exciter instantaneous current.

The output signal 966 of the inverse exciter model 960 may be used to account for lag in a similar manner, so that the reference voltage outputs from both the regulator 962 and the inverse exciter model 960 are each tracking the periodic reference current at the same phasing in time. Effectively, this lag approach can greatly improve the gain accuracy of the current tracking loop at higher frequencies, however, such an approach may sacrifice phase accuracy. Since the phase accuracy of a relatively high frequency excitation current does not affect its overall RMS value or the generator primary field excitation level, but the gain accuracy does directly affect excitation level, this tradeoff may be desirable.

Figure 10:
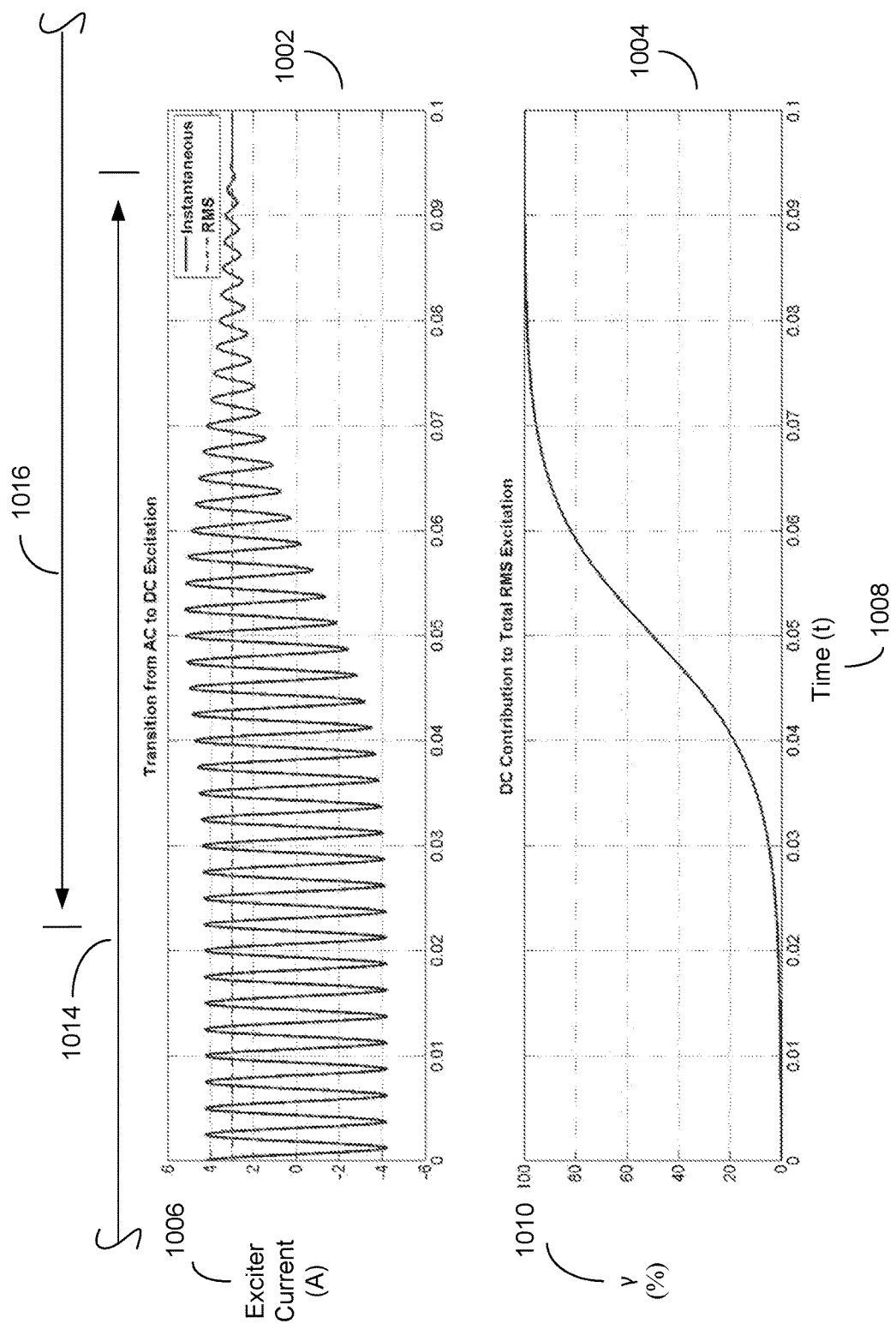
FIG. 10 are example diagrams illustrating a transition of a voltage output signal between AC excitation and DC excitation in accordance with shaft speed.

FIG. 10 are example diagrams illustrating a transition of the exciter voltage between AC excitation and DC excitation in accordance with shaft speed. In the example of FIG. 10, the exciter 603 and the generator 604 may rotate on a common shaft 166, as illustrated in FIG. 1. In other examples, the exciter 603 may be rotated by a separate shaft driven by the same prime mover driving the generator 604, or by a different source of mechanical rotational energy. Although described hereafter in a common shaft configuration, it should be understood that the exciter 603 may be separately driven.

Transition of the exciter voltage between AC excitation and DC excitation may occur anywhere along the range of shaft speed from zero speed to full rated speed. In an example system, at a shaft speed from 0% to about 25% of rated speed, the controller 612 may control the exciter voltage to include only an AC component. The transition of the exciter voltage between AC excitation and DC excitation may occur anywhere between about 25% and 35% of rated speed, and above about 35% of rated speed the controller 612 may control the exciter voltage to include only a DC component. In other examples, the speed range where the exciter voltage includes only the AC component, the speed range where the exciter voltage includes both the AC component and the DC component (during the transition), and the speed range where the exciter voltage includes only the DC component may be different. In some examples, the rotational speed of the exciter may match the rotational speed of the generator, regardless of whether the exciter and the generator are on a common shaft.

In FIG. 10, a first diagram 1002 illustrates the transition from AC to DC excitation, and a second diagram 1004 illustrates the DC contribution to total RMS excitation. In the first diagram 1002, an exciter input current in amps (A) 1006 is illustrated as transitioning from an AC waveform to a DC waveform over a period of time (t) 1008. In the second diagram 1002, in alignment with the time (t) 1008, the % contribution of the DC component (γ) to the RMS excitation is illustrated to correspond with the transition from of the exciter voltage from an AC waveform to a DC waveform. As illustrated in the example of FIG. 10, the excitation controller 612 may maintain a true RMS value of an exciter current during the transition period as the level of the AC component and the level of the DC component included in the waveform of the exciter voltage are varied based on the rotational speed of the exciter.

In order to provide excitation at low rotational speed of the generator 604, an AC current waveform may be used as the exciter voltage at the exciter terminals to avoid decoupling of the exciter rotor and the exciter stator. At substantially zero or low speed of the generator shaft, there may not be enough change in flux per time across the air gap of the exciter 203 for the flux to couple between the exciter stator 234 and the exciter rotor 232. (FIG. 2) Once the shaft speed of the exciter 203 is above a determined system specific threshold (such as about 30% rated shaft speed), then a transition may occur to the use of DC current as an input to the exciter stator terminals without decoupling the exciter rotor and the exciter stator. Thus, the controller 612 may initiate a decrease in the AC component and a corresponding increase in the DC component during a transition period in response to the rotational speed of the exciter 203 increasing above a determined threshold. In other words, the controller 112 may control the exciter voltage to produce flux in the air gap with the AC component within a first range of rotational speed 1014 starting from zero speed and ramping the speed through a part of the transition. In addition, the controller 112 may control the exciter voltage to produce flux in the air gap within a second range of rotational speed 1016 with the DC component starting within the transition and ramping up to full rated speed. As illustrated in FIG. 10, the first range of rotational speed 1014 and the second range of rotational speed 1016 may overlap during the transition, and the second range of rotational speed 1016 may include rotational speeds that are greater than any rotational speeds included in the first range of rotational speed 1014. In the example transition period shown in FIG. 10, the AC component is included in the exciter voltage from 0.0 to 0.095 seconds, and the DC component is included from 0.02 to 0.1 seconds. In other examples, the transition period may be faster, or slower than that illustrated in FIG. 10.

In examples of the present system only one excitation circuit may be used to supply both AC and DC components. As described herein, the single excitation circuit may include the excitation controller 112 and the source of the AC and DC components of the exciter voltage, which are provided based on the voltage output signal 624. The single excitation circuit may smoothly transition the excitation waveform of the exciter 603 between AC and DC. The transition between AC and DC excitation waveform may be accomplished in a manner which preserves the true RMS value of the exciter current, but varies the contribution of AC and DC components towards that total true RMS value. Thus, during the transition the controller 612 may maintain a true RMS value of the exciter current substantially constant by offsetting variations in the AC component and the DC component. The excitation controller 612 may control the waveform of the exciter voltage to include at least one of the AC component and the DC component throughout the time the field current is varied and the generator is outputting variable electric power.

In FIG. 10, an example transition in the time domain is illustrated. In this example, a constant excitation level of three Amps RMS is maintained, while dynamically transitioning between a fully AC waveform (at 400 Hz) to fully a DC waveform of the exciter voltage, based on the voltage output signal 624. This transition of the exciter voltage from AC to DC may occur while shaft speed is increasing through a determined speed range. In addition, the speed of the generator 604 may be increasing through a determined speed range that corresponds to the increasing speed of the exciter 603. Thus, the controller 612 may control the level of the AC component of the exciter voltage so that the generator 604 outputs electric power at the zero speed condition or at a time rotation of the exciter 603 and the generator 604 begins. In addition, during the transition, the controller 612 may decrease the level of the AC component of the exciter voltage while increasing the DC component of the exciter voltage as a rotational speed of the exciter 603 and the generator 604 increases. Further, following the transition, the controller 612 may may control the level of the DC component of the exciter voltage so that the generator 604 outputs electric power at a ramped speed up to full rated speed.

Dynamically transitioning while decreasing speed through the determined range of shaft speed may be reversed (from a fully DC waveform to a fully AC waveform). Thus, during the transition period, the controller 612 may decrease the contribution of the AC component and increase the contribution of the DC component to maintain a linear transition of the exciter voltage as the rotational speed of the exciter 603 increases. Alternatively, the controller 612 may decrease the contribution of the DC component and increase the contribution of the AC component to maintain a linear transition of the exciter voltage as the rotational speed of the exciter decreases.

While transitioning from the AC component to the DC component, or from the DC component to the AC component, the controller 612 may maintain a liner transition of the exciter voltage as the rotational speed of the exciter increases and decreases. During the transition period, when both the AC component and the DC component are present in the exciter voltage, the AC waveform may be modulated on the DC waveform as illustrated in FIG. 10. The exciter voltage may be controlled to include only the AC component at zero speed, or low rotational speed, of the exciter 603, and may be transitioned to include only the DC component above a predetermined exciter speed threshold. During the time when the exciter voltage includes only the AC component, a combination of the AC component and the DC component, or only the DC component, the generator 604 may continuously generate electric power at the output 614 using the field current produced with the exciter voltage.

In one or more examples, the operations described may be implemented in hardware, software, firmware, or any combination thereof. If implemented in software, the operations may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

The subject-matter of the disclosure relates, among others, to the following aspects:

1. A system comprising:
    an exciter configured to output an excitation signal to control a magnetic field of a synchronous generator; and
    a controller configured to control the exciter with an exciter voltage to control the magnetic field and electric power output of the synchronous generator over a range of rotational speed of the exciter;
    a waveform of the exciter voltage selectively including at least one of an AC component or a DC component, and the controller configured to transition a level of the AC component lower and transition a level of the DC component higher based on an increase in rotational speed of the exciter within the range of rotational speed and electric power output of the synchronous generator.

2. The system of claim 1, wherein the controller is configured to transition the exciter voltage from an AC signal to a DC signal based on the rotational speed of the exciter exceeding a threshold.

3. The system as in either claim 1 or 2, the exciter comprises an exciter stator separated by an air gap from an exciter rotor, the exciter rotor rotatable to produce a flux in the air gap with the AC component within a first range of rotational speed, and rotatable to produce a flux in the air gap within a second range of rotational speed with the DC component, the first range of rotational speed including rotational speeds lower than any rotational speed including in the second range of rotational speed.

4. The system as in any of claims 1-3, wherein the controller is configured to maintain a true RMS value of an exciter current as the level of the AC component and the level of the DC component included in the waveform of the exciter voltage are varied based on the rotational speed of the exciter.

5. The system as in any of claims 1-4, wherein the controller is configured to control the waveform of the exciter voltage to include at least one of the AC component and the DC component during a time of electric power output by the synchronous generator.

6. The system as in any of claims 1-5, wherein the controller is configured to provide the exciter voltage to include only the AC component in response to the rotational speed of the exciter being zero.

7. The system as in any of claims 1-6, wherein the exciter is configured to rotate on a common shaft at a common rotational speed with the synchronous generator.

8. The system as in any of claims 1-7, wherein the range of rotational speed is from zero speed to rated operational speed of the exciter.

9. A system comprising:
an exciter configured to generate a variable field current for a synchronous generator, the synchronous generator configured to output variable electric power in accordance with the variable field current; and
a controller configured to control an exciter voltage of the exciter using a voltage input signal to generate the variable field current for the synchronous generator;
the controller further configured to selectively include at least one of a DC component or an AC component in the exciter voltage with the voltage input signal, and
the controller further configured to independently vary the level of the AC component and the level of the DC component as a rotational speed of the exciter changes and the synchronous generator outputs variable electric power.

10. The system of claim 9, wherein the controller is configured to include only the AC component in the exciter voltage when the exciter is at a rotational speed of zero, and transition the AC component to the DC component as the rotational speed of the exciter increases.

11. The system as in either claim 9 or 10, wherein the controller is configured to transition the exciter voltage from only the AC component to only the DC component over a range of an increase in rotational speed of the exciter.

12. The system as in any of claims 9-11, wherein the exciter voltage including both the AC component and the DC component comprises an AC waveform modulated on a DC waveform.

13. The system as in any of claims 9-12, wherein the controller is configured to decrease a contribution of the AC component and increase a contribution of the DC component to maintain a linear transition of the exciter voltage as the rotational speed of the exciter increases.

14. The system of claim 13, wherein the controller is configured to decrease the contribution of the DC component and increase the contribution of the AC component to maintain a linear transition of the exciter voltage as the rotational speed of the exciter decreases.

15. The system as in any of claims 9-14, wherein the controller is configured to initiate a decrease in the AC component and a corresponding increase in the DC component in response to the rotational speed of the exciter increasing above a determined threshold.

16. The system as in any of claims 9-15, wherein the controller is configured to maintain a true RMS value of a current associated with the exciter voltage substantially constant by offsetting variations in the AC component and the DC component.

17. A method comprising:
controlling, with a controller, an exciter voltage of an exciter, the exciter configured to generate a variable field current corresponding to the exciter voltage;
exciting a synchronous generator to output electric power based on the exciter voltage;
commencing rotation of the exciter and the synchronous generator from a zero speed condition;
controlling, with the controller, a level of an AC component of the exciter voltage so that the synchronous generator outputs electric power at the zero speed condition or at a time rotation of the exciter and the generator begins; and
decreasing, with the controller, the level of the AC component of the exciter voltage while increasing, with the controller, a DC component of the exciter voltage as a rotational speed of the exciter and the synchronous generator increases.

18. The method of claim 17, wherein exciting a synchronous generator to output electric power based on the exciter voltage comprises the step of the exciter generating the variable field current based on the exciter voltage being controlled by the controller.

19. The method as in either claim 17 or 18, further comprising transitioning, with the controller, the exciter voltage between an AC waveform and a DC waveform as a speed of the synchronous generator ramps.

20. The method of claim 19, wherein transitioning comprises transitioning, with the controller, the exciter voltage from the AC waveform to the DC waveform as the rotational speed ramps higher, and transitioning, with the controller, the AC waveform to the DC waveform as the rotational speed ramps lower.

Various examples have been described. These and other examples are within the scope of the following claims.

We claim:
1. A system comprising:
an exciter configured to output an excitation signal to control a magnetic field of a synchronous generator; and
a controller configured to control the exciter with an exciter voltage to control the magnetic field and electric power output of the synchronous generator over a range of rotational speed of the exciter;
a waveform of the exciter voltage selectively including at least one of an AC component or a DC component, and the controller configured to transition a level of the AC component lower and transition a level of the DC component higher based on an increase in rotational speed of the exciter within the range of rotational speed and electric power output of the synchronous generator, wherein the synchronous generator is electrically coupled with a load at a zero speed condition of the synchronous generator, and the controller is configured to transition the level of the AC component lower and transition the level of the DC component higher during the increase in rotational speed of the exciter within the range of rotational speed of the synchronous generator between the zero speed condition and rated speed of the synchronous generator while the electric power output is supplied to the load.

2. The system of claim 1, wherein the controller is configured to transition the exciter voltage from an AC signal to a DC signal based on the rotational speed of the exciter exceeding a threshold.

3. The system of claim 1, wherein the exciter comprises an exciter stator separated by an air gap from an exciter rotor, the exciter rotor rotatable to produce a flux in the air gap with the AC component within a first range of rotational speed, and rotatable to produce a flux in the air gap within a second range of rotational speed with the DC component, the first range of rotational speed including rotational speeds lower than any rotational speed including in the second range of rotational speed.

4. The system of claim 1, wherein the controller is configured to maintain a true RMS value of an exciter current as the level of the AC component and the level of the DC component included in the waveform of the exciter voltage are varied based on the rotational speed of the exciter.

5. The system of claim 1, wherein the controller is configured to control the waveform of the exciter voltage to include at least one of the AC component and the DC component during a time of electric power output by the synchronous generator.

6. The system of claim 1, wherein the controller is configured to provide the exciter voltage to include only the AC component in response to the rotational speed of the exciter being zero.

7. The system of claim 1, wherein the exciter is configured to rotate on a common shaft at a common rotational speed with the synchronous generator.

8. The system of claim 1, wherein the range of rotational speed is from zero speed to rated operational speed of the exciter.

9. The system of claim 1, wherein the synchronous generator is electrically coupled with a load comprising a plurality of motors such that the electric power output of the synchronous generator is supplied to the load during the increase in rotational speed of the exciter within the range of rotational speed and electric power output of the synchronous generator.

10. A system comprising:
an exciter configured to generate a variable field current for a synchronous generator, the synchronous generator configured to output variable electric power in accordance with the variable field current; and
a controller configured to control an exciter voltage of the exciter using a voltage input signal to generate the variable field current for the synchronous generator;
the controller further configured to selectively include at least one of a DC component or an AC component in the exciter voltage with the voltage input signal, and the controller further configured to independently vary the level of the AC component and the level of the DC component as a rotational speed of the exciter changes and the synchronous generator outputs variable electric power, wherein the controller is configured to decrease a contribution of the AC component and increase a contribution of the DC component to maintain a linear transition of the exciter voltage as the rotational speed of the exciter increases, and decrease the contribution of the DC component and increase the contribution of the AC component to maintain a linear transition of the exciter voltage as the rotational speed of the exciter decreases.

11. The system of claim 10, wherein the controller is configured to include only the AC component in the exciter voltage when the exciter is at a rotational speed of zero, and transition the AC component to the DC component as the rotational speed of the exciter increases.

12. The system of claim 10, wherein the controller is configured to transition the exciter voltage from only the AC component to only the DC component over a range of an increase in rotational speed of the exciter.

13. The system of claim 10, wherein the exciter voltage including both the AC component and the DC component comprises an AC waveform modulated on a DC waveform.

14. The system of claim 10, wherein the controller is configured to initiate a decrease in the AC component and a corresponding increase in the DC component in response to the rotational speed of the exciter increasing above a determined threshold.

15. The system of claim 10, wherein the controller is configured to maintain a true RMS value of a current associated with the exciter voltage substantially constant by offsetting variations in the AC component and the DC component.

16. A method comprising:
controlling, with a controller, an exciter voltage of an exciter, the exciter configured to generate a variable field current corresponding to the exciter voltage;
exciting a synchronous generator to output electric power based on the exciter voltage;
commencing rotation of the exciter and the synchronous generator from a zero speed condition;
controlling, with the controller, a level of an AC component of the exciter voltage so that the synchronous generator outputs electric power at the zero speed condition or at a time rotation of the exciter and the generator begins; and
maintaining a linear transition of the exciter voltage as a rotational speed of the exciter and the synchronous generator increases and decreases by:
decreasing, with the controller, the level of the AC component of the exciter voltage while increasing, with the controller, a DC component of the exciter voltage as the rotational speed of the exciter and the synchronous generator increases; and
decreasing, with the controller, the level of the DC component of the exciter voltage while increasing, with the controller, the AC component of the exciter voltage as the rotational speed of the exciter and the synchronous generator decreases.

17. The method of claim 16, wherein exciting a synchronous generator to output electric power based on the exciter voltage comprises the step of the exciter generating the variable field current based on the exciter voltage being controlled by the controller.

18. The method of claim 16, further comprising transitioning, with the controller, the exciter voltage between an AC waveform and a DC waveform as a speed of the synchronous generator ramps.

19. The method of claim 18, wherein transitioning comprises transitioning, with the controller, the exciter voltage from the AC waveform to the DC waveform as the rotational speed ramps higher, and transitioning, with the controller, the AC waveform to the DC waveform as the rotational speed ramps lower.

* * * * *